(12) United States Patent
Ishikawa et al.

(10) Patent No.: US 8,955,640 B2
(45) Date of Patent: Feb. 17, 2015

(54) INTEGRAL POWER STEERING APPARATUS

(75) Inventors: Shogo Ishikawa, Saitama (JP); Sosuke Sunaga, Higashimatsuyama (JP)

(73) Assignee: Hitachi Automotive Systems Steering, Ltd., Hiki-gun (JP)

( * ) Notice: Subject to any disclaimer, the term of this patent is extended or adjusted under 35 U.S.C. 154(b) by 294 days.

(21) Appl. No.: 13/528,186

(22) Filed: Jun. 20, 2012

(65) Prior Publication Data

US 2013/0048410 A1 Feb. 28, 2013

(30) Foreign Application Priority Data

Aug. 22, 2011 (JP) ................. 2011-180132

(51) Int. Cl.
*B62D 5/22* (2006.01)
*B62D 5/06* (2006.01)
*B62D 5/24* (2006.01)

(52) U.S. Cl.
CPC .......... *B62D 5/061* (2013.01); *B62D 5/22* (2013.01); *B62D 5/24* (2013.01)
USPC ............................ 180/441; 91/400; 180/428

(58) Field of Classification Search
CPC .............................. B62D 5/061; F02M 63/005
USPC ............ 180/417, 439, 441, 428, 429; 91/374, 91/392, 394, 399, 400, 401, 407; 137/454.5

See application file for complete search history.

(56) References Cited

U.S. PATENT DOCUMENTS

| | | | | |
|---|---|---|---|---|
| 3,872,774 A | * | 3/1975 | Forster et al. | 91/400 |
| 4,028,996 A | * | 6/1977 | Jablonsky | 91/401 |
| 4,170,925 A | * | 10/1979 | Katz et al. | 91/400 |
| 5,562,017 A | * | 10/1996 | Wuenscher | 91/375 A |
| 5,803,201 A | * | 9/1998 | Sheppard | 180/429 |
| 6,318,232 B1 | * | 11/2001 | Lemke et al. | 91/375 A |
| 6,896,093 B2 | * | 5/2005 | Ishikawa et al. | 180/417 |
| 8,056,574 B2 | * | 11/2011 | Erickson et al. | 137/15.18 |

FOREIGN PATENT DOCUMENTS

JP 4-065667 U 6/1992

* cited by examiner

*Primary Examiner* — Anne Marie Boehler
(74) *Attorney, Agent, or Firm* — Foley & Lardner LLP

(57) ABSTRACT

In a stroke-limiter equipped integral power steering apparatus, a valve body of a spring-loaded-plunger-equipped limiter valve is configured to enable a position of the valve body relative to a housing to be adjusted in a longitudinal direction of the valve body via an intermediate sleeve.

5 Claims, 5 Drawing Sheets

INTEGRAL POWER STEERING APPARATUS

TECHNICAL FIELD

The present invention relates to an integral power steering apparatus in which a control valve and a power cylinder are integrally added to a steering gear.

BACKGROUND ART

To limit a stroke of a piston installed in a power cylinder, some integral power steering apparatuses are equipped with a stroke limiter. One such stroke-limiter equipped integral power steering apparatus has been disclosed in Japanese Published Utility Model application No. 4-65667 (hereinafter is referred to as JU4-65667). In the stroke-limiter equipped integral power steering apparatus disclosed in JU4-65667, the stroke limiter is comprised of a plunger-equipped limiter valve. When a steering wheel angle (a steering wheel movement) reaches a predetermined value, in other words, when a sector gear reaches a predetermined angular position, the tip of the plunger is pushed by the tooth face of the sector gear and thus the stroke limiter (the limiter valve) becomes opened. With the stroke limiter kept at its valve-open position, an assisting pressure drops, and hence a piston stroke is suppressed or limited properly.

SUMMARY OF THE INVENTION

However, in the case of the stroke-limiter equipped integral power steering apparatus disclosed in JU4-65667, an adjusting allowance of the valve-open position of the stroke limiter, in other words, an adjusting allowance of the position of the tip of the plunger relative to the inner peripheral wall of a steering housing (i.e., a stroke-limiter-mounting tapped hole) into which the stroke limiter is screwed, is slight. Thus, the stroke-limiter equipped integral power steering apparatus as disclosed in JU4-65667 has the difficulty of providing satisfactory adjustment of the valve-open position of the stroke limiter. Additionally, in the case of the stroke-limiter equipped integral power steering apparatus disclosed in JU4-65667, a lock nut is threadably engaged with the external screw-threaded portion formed on the outer peripheral surface of a valve body accommodating therein a spring-loaded plunger. Also, the external screw-threaded portion of the valve body itself is directly screwed into the steering housing. Hence, adjustment of the valve-open position of the stroke limiter, in other words, adjustment of the position of the tip of the plunger relative to the inside end face of the stroke-limiter-mounting tapped hole of the steering housing, is troublesome. Also, the internal screw-threaded portion (the stroke-limiter-mounting tapped hole) of the steering housing itself constructs a part of the relative-position adjusting mechanism for adjusting the valve-open position of the stroke limiter. This type of relative-position adjusting mechanism requires high-precision machining for the stroke-limiter-mounting tapped hole of the steering-housing side as well as the external screw-threaded portion of the valve body of the stroke-limiter side, thereby increasing manufacturing costs. From the viewpoint of reduced manufacturing costs, increased applicability, lightweight, and lower stroke-limiter installation time and costs, the compactly-designed stroke limiter that enables an adequate adjusting allowance and easy but precise adjustment of its valve-open position, would be desirable.

It would be desirable to provide a compactly-designed stroke limiter whose valve-open position can be satisfactorily easily precisely adjusted depending on the type of vehicle and/or the size of tires the automotive vehicles use.

Accordingly, it is an object of the invention to provide a compact integral power steering apparatus equipped with a compactly-designed stroke limiter capable of satisfactorily easily precisely adjusting its limiter-valve-open position.

In order to accomplish the aforementioned and other objects of the present invention, an integral power steering apparatus comprises a housing, an input shaft adapted to be connected to a steering wheel, a piston slidably accommodated in the housing and configured to partition an internal space of the housing into a first pressure chamber and a second pressure chamber, a first motion converter interposed between the input shaft and the piston for converting rotary motion of the input shaft into linear motion of the piston, a second motion converter including a rack integrally formed on an outer periphery of the piston and a sector gear kept in meshed-engagement with the rack for converting linear motion of the rack into rotary motion and arranged in the second pressure chamber, a control valve configured to selectively supply working fluid, fed from an external working-fluid pressure source, into either one of the first and second pressure chambers, a motion transmitter adapted to transmit a movement of the sector gear about a rotation axis to a steered road wheel, a first valve configured to direct working-fluid pressure in the second pressure chamber to the first pressure chamber, when the piston reaches a first predetermined position in a direction for decreasing a volumetric capacity of the first pressure chamber, and a second valve configured to direct working-fluid pressure in the first pressure chamber to the second pressure chamber, when the piston reaches a second predetermined position in a direction for decreasing a volumetric capacity of the second pressure chamber, the first valve installed on the housing in such a manner as to face the first pressure chamber, the first valve comprising first valve body having a first plunger-accommodation bore formed therein, a first plunger housed in the first plunger-accommodation bore in such a manner as to retract or extend in a longitudinal direction of the first valve body, a first seat installed on the first valve body in such a manner as to construct a part of a first communication passage through which the first and second pressure chambers can be communicated with each other, and configured to prevent working-fluid flow through the first communication passage with the first plunger abutted on the first seat, and further configured to permit working-fluid flow through the first communication passage with the first plunger moved apart from the first seat, a first biasing member provided for permanently biasing the first plunger toward the first seat, a first abutted-engagement portion attached to the first plunger in such a manner as to protrude from the first seat toward the first pressure chamber, and configured to be brought into abutted-engagement with a first abutment portion corresponding to one end face of the piston when the first predetermined position of the piston is reached, and further configured to move together with the first plunger by a push of the first abutment portion, thereby causing the first plunger to be spaced apart from the first seat to permit the first pressure chamber to be communicated with the second pressure chamber through the first communication passage, and a first intermediate sleeve formed separately from the housing, the second valve installed on the housing in such a manner as to face the second pressure chamber, the second valve comprising a second valve body having a second plunger-accommodation bore formed therein, a second plunger housed in the second plunger-accommodation bore in such a manner as to retract or extend in a longitudinal direction of the second valve body, a second seat installed on the second valve body in such a manner as to construct a part of a second communication passage through which the first and second pressure chambers can be communicated with each other, and configured to prevent working-fluid flow through the second communication passage with the second plunger abutted on the second seat, and further configured to permit working-fluid flow through the second communication passage with the second plunger moved apart from the second seat, a second biasing member provided for permanently biasing the second plunger toward the second seat, a second abutted-engagement portion attached to the second plunger in such a manner as to protrude from the second seat toward the second pressure chamber, and configured to be brought into abutted-engagement with a second abutment portion corresponding to either one of the other end face of the piston and the sector gear when the second predetermined position of the piston is reached, and further configured to move together with the second plunger by a push of the second abutment portion, thereby causing the second plunger to be spaced apart from the second seat to permit the second pressure chamber to be communicated with the first pressure chamber through the second communication passage, and a second intermediate sleeve formed separately from the housing, wherein the first valve body of the first valve is configured to enable a position of the first valve body relative to the housing to be adjusted in the longitudinal direction of the first valve body via the first intermediate sleeve, and the second valve body of the second valve is configured to enable a position of the second valve body relative to the housing to be adjusted in the longitudinal direction of the second valve body via the second intermediate sleeve.

The other objects and features of this invention will become understood from the following description with reference to the accompanying drawings.

DESCRIPTION OF THE PREFERRED EMBODIMENTS

Figure 1:
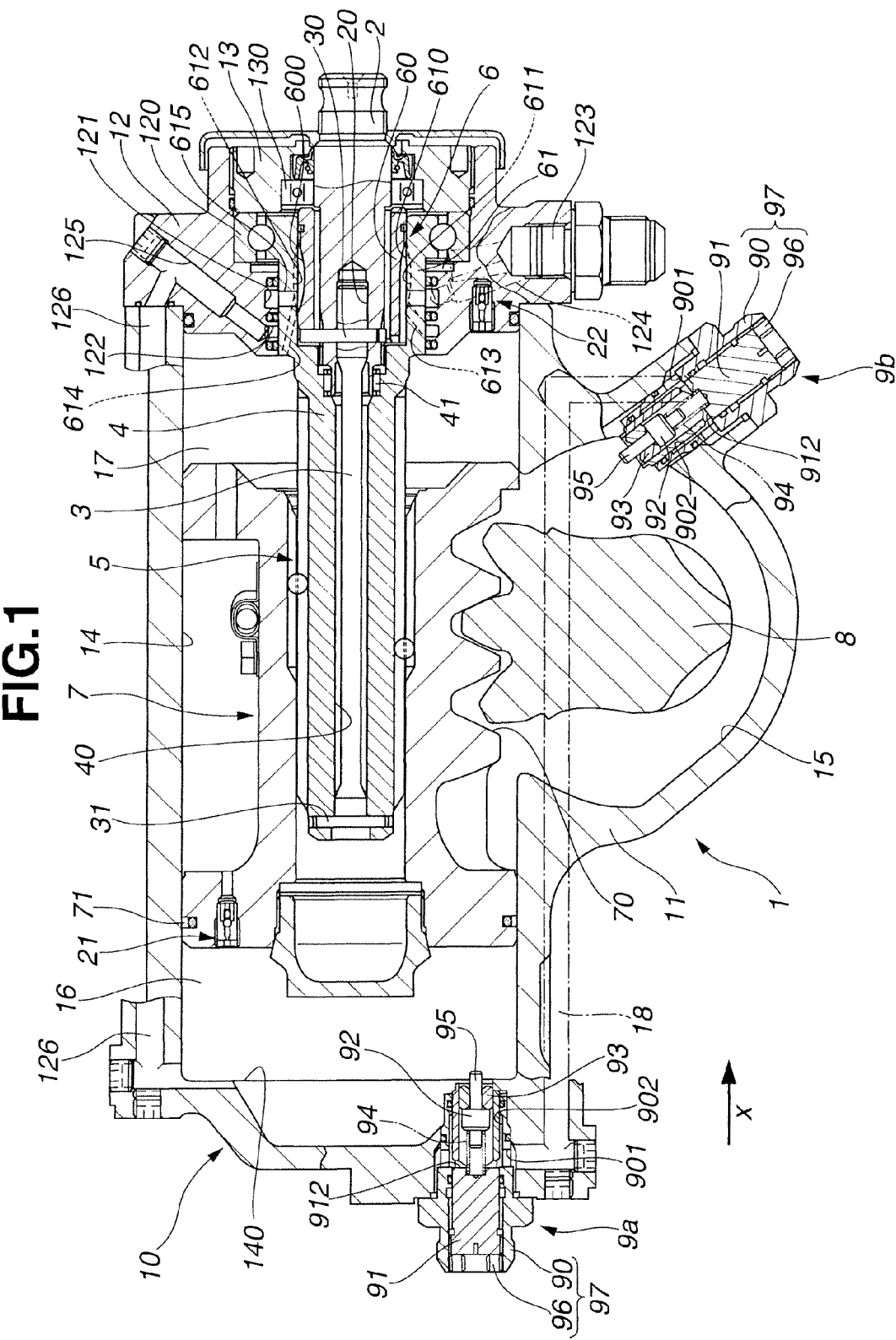
FIG. 1 is a longitudinal cross-sectional view illustrating an embodiment of an integral power steering apparatus, in a state where position adjustment of each limiter valve relative to a steering housing is not yet made before installing the power steering apparatus on an automotive vehicle.

Referring now to the drawings, particularly to FIG. 1, a stroke limiter equipped integral power steering apparatus 1 of the embodiment is exemplified in a power steering system of an automotive vehicle. FIG. 1 is the longitudinal cross section of power steering apparatus 1 (not yet installed on the vehicle), cut along the plane passing through the rotation axis of an input shaft 2 and perpendicular to the rotation axis of a sector gear 8. Assuming that the direction of the rotation axis of input shaft 2 is taken as an "x-axis", a direction of "x-axis", directed from the input shaft 2 to the steering-wheel side, that is, the rightward direction (viewing FIG. 1) is a positive x-axis direction, whereas the opposite direction of "x-axis" is a negative x-axis direction.

Power steering apparatus 1 is comprised of a housing 10, the input shaft (a stub shaft) 2, a piston 7, a first motion converter (concretely, a ball-screw mechanism 5), a second motion converter for converting linear motion of a rack 70, integrally formed on the outer periphery of piston 7, into rotary motion, a control valve 6, a motion-transmission mechanism (simply, a motion transmitter, concretely, a pitman arm), and a limiter valve 9. Input shaft 2 is adapted to be connected to the steering wheel of the vehicle. Piston 7 is slidably accommodated in the housing 10 and configured to partition an internal space of housing 10 into a first pressure chamber 16 and a second pressure chamber 17. The first motion converter (ball-screw mechanism 5) is interposed between the input shaft 2 and the piston 7 for converting rotary motion of input shaft 2 into linear motion of piston 7. The second motion converter includes the rack 70 and the sector gear 8 kept in meshed-engagement with the rack 70 (the rack piston 7) for converting linear motion of rack 70 into rotary motion and arranged in the second pressure chamber 17. Control valve 6 is configured to selectively supply working fluid (hydraulic operating oil), fed from an external working-fluid pressure source (e.g., an oil pump), into either one of the first and second pressure chambers 16-17. The motion transmitter (the pitman arm) is configured or adapted to transmit a movement of sector gear 8 about its rotation axis via a steering linkage to a steered road wheel of the vehicle. Limiter valve 9 serves as a stroke limiter configured to limit or suppress a stroke of piston 7 in the x-axis direction by decreasing the hydraulic pressure in a higher one of first and second pressure chambers 16-17 (in other words, by increasing the hydraulic pressure in a lower one of first and second pressure chambers 16-17), when a predetermined steering-wheel angle has been reached.

Housing 10 is comprised of a steering housing 11, a valve housing 12, and a cover 13. Steering housing 11 is configured to accommodate therein the piston 7 and the sector gear 8. Valve housing 12 is arranged on the side of the positive x-axis direction with respect to the steering housing 11 and configured to accommodate therein the control valve 6. Cover 13 is configured to hermetically close the opening end of valve housing 12, which opening end faces in the positive x-axis direction.

Input shaft 2 is rotatably supported on the cover 13 via a ball bearing 130. Input shaft 2 has a substantially cylindrical bore 20 formed in the input-shaft end on the side of the negative x-axis direction. The axial end of a torsion bar 3 on the side of the positive x-axis direction is inserted into the cylindrical bore 20 of input shaft 2. The outer periphery of input shaft 2 on the side of the negative x-axis direction is inserted into the inner periphery of a substantially cylindrical-hollow rotor 60. Input shaft 2, torsion bar 3, and rotor 60 are integrally connected to each other by means of a pin 30 for co-rotation. A worm shaft 4 is connected via the torsion bar 3 to the input shaft 2. A rotary valve body (simply, a valve body) 61 is formed integral with the basal portion of the positive x-axis direction of worm shaft 4. Valve body 61 is rotatably supported on the valve housing 12 via a ball bearing 120.

Valve body 61 has a substantially cylindrical rotor-accommodation bore 610 formed therein for rotatably accommodating the rotor 60. Worm shaft 4 has an axially-extending torsion-bar-accommodation bore 40 formed therein for accommodating the torsion bar 3. Torsion-bar-accommodation bore 40 of worm shaft 4 communicates with the rotor-accommodation bore 610 of valve body 61. The outer periphery of the axial end (the left-hand axial end, viewing FIG. 1) of input shaft 2 on the side of the negative x-axis direction is inserted into the inner periphery of the opening end of torsion-bar-accommodation bore 40 on the side of the positive x-axis direction. Also, the left-hand axial end of input shaft 2 is rotatably supported by means of a bearing 41. The axial end of torsion bar 3 on the side of the negative x-axis direction is fixedly connected to the axial end of worm shaft 4 on the side of the negative x-axis direction by means of a pin 31.

Piston 7 is installed on the worm shaft 4, so that piston 7 (rack 70) is movable in the x-axis direction through the ball-screw mechanism 5. Also, piston 7 is slidably accommodated in a cylinder 14 (a cylindrical portion constructing part of the steering housing 11 and defining therein a cylindrical internal space). The axial end of cylinder 14 on the side of the positive x-axis direction is formed as an opening end. The opposite axial end of cylinder 14 on the side of the negative x-axis direction is closed by a bottom 140. Sector gear 8 is accommodated in a gear chamber 15 defined in the steering housing 11 in a manner so as to extend in a direction perpendicular to the centerline of cylinder 14. Sector gear 8 is connected or mechanically linked to a pitman arm via a pitman-arm shaft (a sector shaft), for example. A piston seal 71 is fitted into an annular seal groove formed in the outer periphery of piston 7. The internal space of cylinder 14 is partitioned into the first pressure chamber 16 and the second pressure chamber 17 by means of the piston seal 71, so as to achieve a power-cylinder action. In the shown embodiment, the side of the negative x-axis direction of cylinder 14, partitioned by the piston seal 71, serves as the first pressure chamber 16, whereas the side of the positive x-axis direction of cylinder 14, partitioned by the piston seal 71, and the gear chamber 15 both serve as the second pressure chamber 17.

Control valve 6 has the rotor 60 and the valve body 61. A plurality of directional-control grooves 600, each extending in the x-axis direction, are formed or cut on the outer periphery of rotor 60 and circumferentially spaced from each other. A plurality of first axial grooves 611, each extending in the x-axis direction, and a plurality of second axial grooves 612, each extending in the x-axis direction, are formed or cut on the inner periphery of rotor-accommodation bore 610 of valve body 61, opposing to the outer periphery of rotor 60. The first axial grooves 611 and the second axial grooves 612 are circumferentially spaced from each other. A circumferentially-extending inlet-side groove 121 and a circumferentially-extending first-pressure-chamber side groove 122 are formed or cut on the inner peripheral surface of valve housing 12, opposing to the outer periphery of valve body 61. The inlet-side circumferential groove 121 and the first-pressure-chamber side circumferential groove 122 are spaced from each other in the x-axis direction. A first oil passage 613, a second oil passage 614, and a third oil passage 615 are formed in the valve body 61. The first axial grooves 611 communicate with the first-pressure-chamber side circumferential groove 122 via the first oil passage 613. The second axial grooves 612 communicate with the second pressure chamber 17 via the second oil passage 614. The inner and outer peripheries of valve body 61 are communicated with each other via the third oil passage 615. An inlet port 123, a fourth oil passage 124, and a fifth oil passage 125 are formed in the valve housing 12.

Inlet port 123 is connected to the external working-fluid pressure source (e.g., an oil pump). Inlet port 123 communicates with the inlet-side circumferential groove 121 via the fourth oil passage 124. The fifth oil passage 125 is connected to the first-pressure-chamber side circumferential groove 122. A sixth oil passage 126 is formed in the steering housing 11. The fifth oil passage 125 communicates with the first pressure chamber 16 via the sixth oil passage 126. The directional-control grooves 600 of rotor 60, the first axial grooves 611 of valve body 61, and the second axial grooves 612 of valve body 61 construct the directional control rotary valve 6 via which the direction of flow of working fluid fed from the external working-fluid pressure source (e.g., the oil pump) can be switched between the first pressure chamber 16 and the second pressure chamber 17 by virtue of relative rotation between input shaft 2 (rotor 60) and valve body 61.

A first relief valve 21 is disposed in the piston 7, whereas a second relief valve 22 is disposed in the valve housing 12. The first relief valve 21 is configured to be opened when the pressure in the first pressure chamber 16 exceeds the pressure in the second pressure chamber 17 and then the pressure difference between the first and second pressure chambers 16-17 reaches a predetermined threshold value (a high enough value), so as to direct working fluid in the first pressure chamber 16 to the second pressure chamber 17. The second relief valve 22 is configured to be opened when the pressure in the second pressure chamber 17 exceeds the pressure in the inlet port 123 and then the pressure difference between the second pressure chamber 17 and the inlet port 123 reaches a predetermined threshold value (a high enough value), so as to direct working fluid in the second pressure chamber 17 to the inlet port 123. In the shown embodiment, the first and second relief valves 21-22 are added to the piston and the valve housing 12, respectively. In lieu thereof, these pressure relief valves may be eliminated.

Limiter valve 9 (the stroke limiter) is comprised of a first valve 9a and a second valve 9b. The first valve 9a is configured to direct working-fluid pressure in the second pressure chamber 17 to the first pressure chamber 16, when piston 7 (i.e., the position of the sliding piston) reaches a first predetermined position in a direction (i.e., the negative x-axis direction) for decreasing a volumetric capacity of the first pressure chamber 16. The second valve 9b is configured to direct working-fluid pressure in the first pressure chamber 16 to the second pressure chamber 17, when piston 7 reaches a second predetermined position in a direction (i.e., the positive x-axis direction) for decreasing a volumetric capacity of the second pressure chamber 17. The first valve 9a is installed on the steering housing 11 in such a manner as to face the first pressure chamber 16. On the other hand, the second valve 9b is installed on the steering housing 11 in such a manner as to face the second pressure chamber 17 (the gear chamber 15). The first valve 9a is connected to the second valve 9b via a seventh oil passage 18 formed in the steering housing 11. FIG. 1 shows the longitudinal cross section of each of first and second valves 9a-9b in a state where power steering apparatus 1 is not yet installed on the vehicle and thus position adjustment of each of first and second valves 9a-9b (a valve body 91 and a pin 95, both described later) relative to the steering housing 11 is not yet made.

Figure 2:
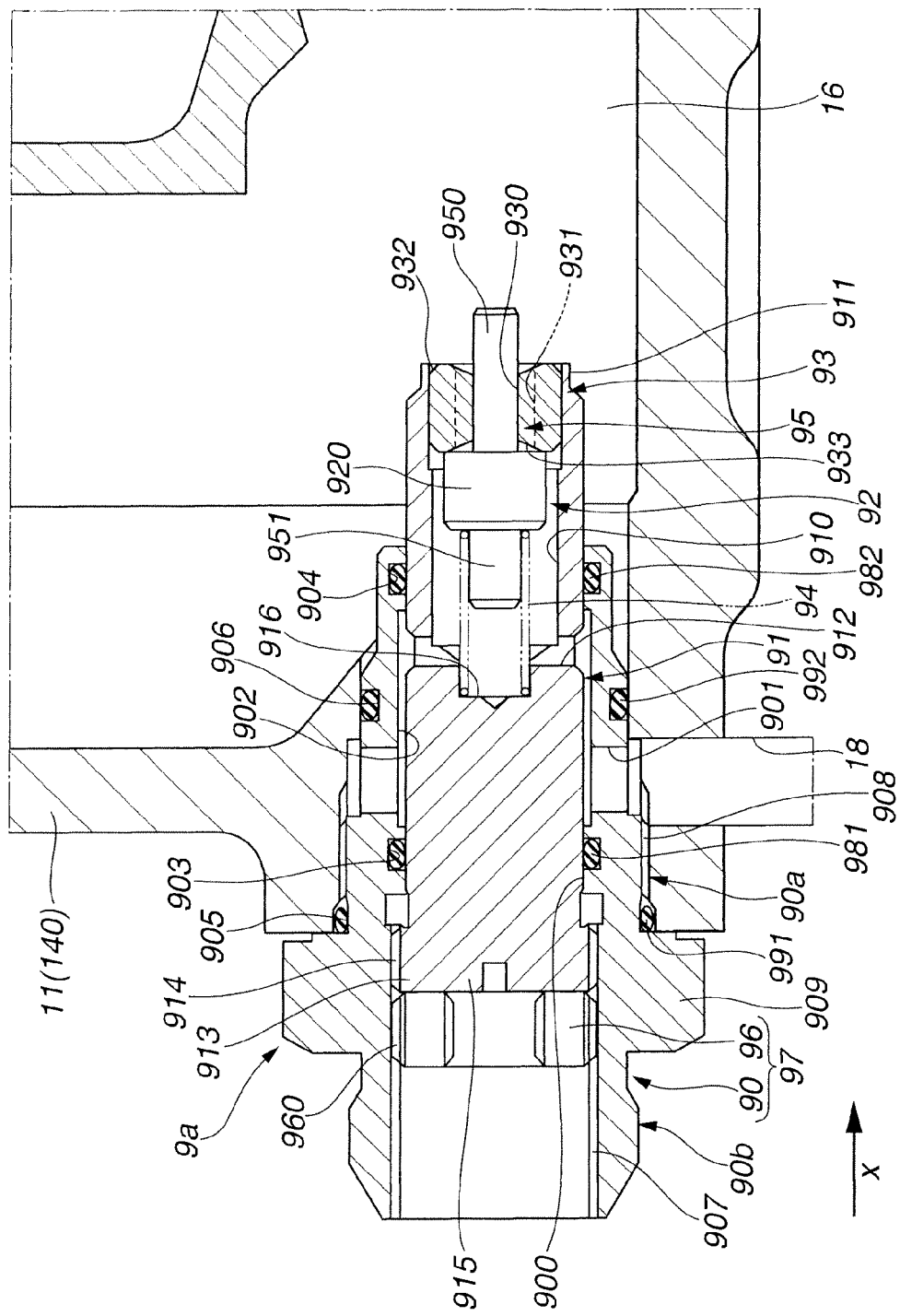
FIG. 2 is a partial cross-sectional view illustrating the limiter valve installed in the integral power steering apparatus of the embodiment, in a state where relative-position adjustment of the limiter valve has been made after having installed the power steering apparatus on the vehicle.

Details of limiter valve 9 are hereunder described. By the way, first and second valves 9a-9b are similar to each other in construction. Hence, for the sake of simplicity in the following discussion, only the construction of the first valve 9a is explained in detail. FIG. 2 is the partial cross section of power steering apparatus 1, showing the first valve 9a cut along the plane passing through the centerline of the valve body 91. In particular, FIG. 2 shows the longitudinal cross section of the first valve 9a in a state where power steering apparatus 1 has been installed on the vehicle and thus position adjustment of the first valve 9a (valve body 91 and pin 95) relative to the steering housing 11 has already been made.

The first valve 9a is located on the side of first pressure chamber 16 of housing 10, that is, on the side of the bottom 140 of steering housing 11. The first valve 9a is comprised of the valve body 91, a plunger 92, a valve seat (simply, a seat 93), a biasing member (e.g., a coil spring 94), an abutted-engagement portion (a pin 95), and a valve-position adjuster (a valve-position adjusting mechanism) 97 (i.e., a valve housing 90 and a lock nut 96). Valve body 91 has a plunger-accommodation bore 910 formed therein for accommodating the plunger 92. Plunger 92 is housed in the plunger-accommodation bore 910 of valve body 91 in such a manner as to retract or extend in the longitudinal direction of valve body 91, that is, in the x-axis direction. Seat 93 is installed on the valve body 91 in such a manner as to construct a part of a communication passage through which first and second pressure chambers 16-17 can be communicated with each other. Seat 93 is configured to prevent (disable) working-fluid flow through the communication passage with the plunger 92 abutted (or seated) on the seat 93, in other words, with the plunger 92 kept at the valve-closed position. Seat 93 is further configured to permit (enable) working-fluid flow through the communication passage with the plunger 92 moved apart from the seat 93. Biasing member (coil spring 94) is provided for permanently biasing or forcing the plunger 92 toward the seat 93. The abutted-engagement portion (pin 95) is attached to the plunger 92 in such a manner as to protrude from the end face (the right-hand end face, viewing FIG. 2) of the seat 93 toward the first pressure chamber 16. The abutted-engagement portion (pin 95) is brought into abutted-engagement with the left-hand end face of piston 7 when the previously-discussed first predetermined position of piston 7 is reached, and then the abutted-engagement portion (pin 95), together with the plunger 92, moves leftward (viewing FIG. 2) by a push of piston 7, thereby causing the plunger 92 to be spaced apart from the seat 93 to permit the first pressure chamber 16 to be communicated with the second pressure chamber 17 (in other words, to establish fluid-communication between first and second pressure chambers 16-17). Valve-position adjuster 97 is formed separately from the housing 10 and interposed between the housing 10 and the valve body 91, and has a valve-body accommodation bore 900 formed therein for accommodating the valve body 91. Valve-position adjuster 97 is comprised of the valve housing 90 (the intermediate sleeve) and the lock nut 96. As detailed later, the intermediate sleeve (valve housing 90), interposed between the housing 10 and the valve body 91, enables an adequate adjusting allowance and easy but precise adjustment of the valve-open position of the stroke limiter (limiter valve 9).

Plunger-accommodation bore 910 of valve body 91 is arranged on the side of the positive x-axis direction of valve body 91. The outer periphery of the opening end of plunger-accommodation bore 910 on the side of the positive x-axis direction is formed with a plurality of comparatively thin-walled, circumferentially-spaced caulked portions 911. A radial through hole 912 is formed in the valve body 91 and arranged on the side of the negative x-axis direction of plunger-accommodation bore 910, such that the plunger-accommodation bore 910 and the outer peripheral side of valve body 91 are communicated with each other via the radial through hole 912. The back end of valve body 91 (the axial rear end of valve body 91 on the side of the negative x-axis direction) is formed as a screw-thread portion 913. Screw-thread portion 913 has an external screw-threaded portion 914 formed on its outer peripheral surface and a slotted head 915 of the rearmost end.

Seat 93 is formed into a substantially cylindrical-hollow shape. The hollow portion of seat 93 constructs a pin-insertion hole 930. Also, seat 93 has a caulked abutment portion 932 tapered radially outward from a position (a boundary or a perimeter) corresponding to approximately one-third the radial thickness of the cylindrical-hollow cross section of seat 93 (on both axial ends) and a seat surface 933 tapered radially inward from the position (the boundary or the perimeter) corresponding to approximately one-third the radial thickness of the cylindrical-hollow cross section of seat 93 (on both axial ends). Pin-insertion hole 930 of seat 93 has a plurality of communication grooves 931 extending in the x-axis direction and formed in the inner peripheral surface of pin-insertion hole 930. In the shown embodiment, four axial communication grooves 931, circumferentially equidistant-spaced from each other, are formed in the inner peripheral surface of pin-insertion hole 930. Both axial ends of seat 93 are communicated with each other via the four axially-extending communication grooves 931. The leftward opening ends (viewing FIG. 2) of communication grooves 931, opening from the left-hand side seat surface 933 into the plunger-accommodation bore 910, can be closed by abutment of the right-hand side end face of plunger 92 with the left-hand side seat surface 933.

Plunger 92 is formed into a stepped shape by the small-diameter pin 95 and a large-diameter plunger-piston portion (simply, a large-diameter portion) 920 integrally connected to each other. The stepped portion of plunger 92, facing in the negative x-axis direction, that is, the end face of the negative x-axis direction of large-diameter portion 920, constructs a spring seat on which one end of coil spring 94 is seated. The stepped portion of plunger 92, facing in the positive x-axis direction, that is, the end face of the positive x-axis direction of large-diameter portion 920, constructs a valve element, which can be brought into abutted-engagement with the seat 93. On the other hand, pin 95 is formed into an elongated cylindrical shape. Small-diameter elongated cylindrical pin 95 and large-diameter plunger-piston portion 920 are integrally connected to each other by press-fitting the pin 95 into the axially-extending central bore (a through hole) formed in the large-diameter portion 920. A portion of pin 95, protruding from the large-diameter portion 920 in the positive x-axis direction, is slidably inserted or loosely fitted into the inner periphery of seat 93 (that is, the pin-insertion hole 930), so as to construct or provide the abutted-engagement portion 950, which can be brought into abutted-engagement with the piston 7. By the way, the axial length of abutted-engagement portion 950 of pin 95 from the end face of large-diameter portion 920, facing in the positive x-axis direction, to the tip of abutted-engagement portion 950 (i.e., the end face of abutted-engagement portion 950 facing in the positive x-axis direction, is dimensioned to be greater than the entire axial length of the cylindrical-hollow seat 93. A portion of pin 95, protruding from the large-diameter portion 920 in the negative x-axis direction, constructs a spring retainer 951 for holding the coil spring 94 by inserting the portion of pin 95 extending in the negative x-axis direction into the inner periphery of coil spring 94.

Coil spring 94 is interposed between the plunger 92 and the valve body 91. Coil spring 94 is held between a spring seat 916 formed at the bottom of plunger-accommodation bore 910 of valve body 91 on the side of the negative x-axis direction of plunger-accommodation bore 910 and the spring seat of large-diameter portion 920 of plunger 92 under preload (under a compressed state), so as to bias the plunger 92 in the direction for abutting the large-diameter portion 920 of plunger 92 with the seat surface 933 of seat 93, that is, in the direction for closing the limiter valve 9a. Forcing the pin 95 (exactly, the abutted-engagement portion 950) in the negative x-axis direction by a force (a pressure) against the force of coil spring 94 enables a sliding motion of plunger 92 within a range wherein the spring retainer 951 is out of abutted-engagement with the spring seat 916 of valve body 91. By the way, an undesirable inclination of plunger 92 with respect to the x-axis direction can be suppressed by allowing the outer periphery of abutted-engagement portion 950 of pin 95 to be appropriately stably guided by and slid relative to the inner periphery of pin-insertion bore 930 of seat 93. Also used or provided is a biasing member (i.e., the coil spring 94) having a spring stiffness that, when the pressure of working fluid supplied into the first pressure chamber 16, in other words, the pressure acting on the pressure-receiving surface of plunger 92, facing in the positive x-axis direction, becomes higher than a predetermined pressure value, plunger 92 begins to move in the negative x-axis direction apart from its seat surface 933, thus opening the first valve 9a, and that, conversely when the pressure acting on the pressure-receiving surface of plunger 92, facing in the positive x-axis direction, becomes less than the predetermined pressure value due to no working-fluid supply to the first pressure chamber 16, plunger 92 rests on the seat 93, thus remaining kept at its initial position (i.e., the spring-loaded position, in other words, the valve-closed position of the first valve 9a).

Valve-position adjuster 97 is comprised of the valve housing 90 (the intermediate sleeve) and the lock nut 96. Valve housing 90 is formed with a radial through hole 901 (a valve-position-adjuster through hole), which is configured to communicate on the inner peripheral side of valve housing 90 with the radial through hole 912 of valve body 91, and further configured to communicate on the outer peripheral side of valve housing 90 with the second pressure chamber 17 (i.e., the seventh oil passage 18). Valve housing 90 is also formed with a communication groove 902 formed in the inner peripheral surface of valve housing 90, a pair of axially-spaced seal members (i.e., a first seal member 981 and a second seal member 982) located on both sides of communication groove 902 in the longitudinal direction (in the axial direction) of valve body 91 to seal between valve housing 90 and valve body 91, and an internal screw-threaded portion 907 formed on the inner peripheral side.

Valve housing 90 is comprised of an inserted portion 90a, which is inserted into the steering housing 11, and a non-inserted portion 90b, which is not inserted into the steering housing 11 but stuck outside of the steering housing 11. Inserted portion 90a has a substantially cylindrical valve-body accommodation bore 900 formed therein. The previously-discussed communication groove 902 is formed in the inner peripheral surface of valve-body accommodation bore 900 around the entire circumference. Also, inserted portion 90a of valve housing 90 is formed with the radial through hole 901, radially penetrating the inserted portion 90a on the side of negative x-axis direction of communication groove 902, in such a manner as to open into the inner and outer peripheries of the cylindrical-hollow inserted portion 90a. Radial through hole 901 is formed in the inserted portion 90a in such a manner as to penetrate from the outer peripheral side of valve housing 90 to the valve-body accommodation bore 900 (to the communication groove 902). Also, radial through hole 901 is connected to the seventh oil passage 18 under a state where valve housing 90 has been installed on the steering housing 11. One axial end (the left-hand end on the side of the negative x-axis direction) of communication groove 902 (the annular groove) is formed to extend to such an extent that the left-hand end of communication groove 902 is opposed to the radial through hole 912 of valve body 91 under a state where valve body 91 is positioned substantially at the outermost position relatively to the valve housing 90 in its longitudinal direction, exactly, in the negative x-axis direction (see FIG. 1). In a similar manner, the other axial end (the right-hand end on the side of the positive x-axis direction) of communication groove 902 is formed to extend to such an extent that the right-hand end of communication groove 902 is opposed to the radial through hole 912 of valve body 91 under a state where valve body 91 is positioned substantially at the innermost position relatively to the valve housing 90 in its longitudinal direction, exactly, in the positive x-axis direction (see FIG. 2). For instance, as seen in FIG. 1, under a state where valve body 91 is positioned on the side of the negative x-axis direction relatively to the valve housing 90, radial through hole 912 of valve body 91 opens into the left-hand side of the annular communication groove 902 of valve housing 90. As seen in FIG. 2, even under a state where valve body 91 is positioned on the side of the positive x-axis direction relatively to the valve housing 90, radial through hole 912 of valve body 91 opens into the right-hand side of the annular communication groove 902 of valve housing 90. In other words, the range of formation of communication groove 902 of valve housing 90 in the x-axis direction is set or dimensioned so that radial through hole 912 always communicates with the communication groove 902 within a movable range of valve body 91 relative to valve housing 90. Two seal grooves (e.g., O-ring grooves) 903-904 are formed in the inner peripheral surface of inserted portion 90a (i.e., valve-body accommodation bore 900 of valve housing 90) around the entire circumference and located on both sides of the axially circumferentially-extending annular communication groove 902. The previously-discussed first seal member 981 (e.g., an O ring) is fitted to the first groove 903 of the two seal grooves, whereas the previously-discussed second seal member 982 (e.g., an O ring) is fitted to the second groove 904. In the shown embodiment, O rings are used as the seal members 981-982. In lieu thereof, another type of seal member may be used as an oil seal ring.

Also, the outer periphery of the root of inserted portion 90a of valve housing 90 is formed as a screw-thread portion adjacent to the side of the negative x-axis direction of radial through hole 901 of valve housing 90. The screw-thread portion of inserted portion 90a has an external screw-threaded portion 908 formed on its outer peripheral surface. Two seal grooves (e.g., O-ring grooves) 905-906 are formed in the outer peripheral surface of inserted portion 90a around the entire circumference and located on both sides of the external screw-threaded portion 908 and radial through hole 901. Exactly, seal groove 905 is arranged in the basal end of the external screw-threaded portion 908, whereas seal groove 906 is arranged adjacent to the side of the positive x-axis direction of radial through hole 901. A third seal member 991 (e.g., an O ring) and a fourth seal member 992 (e.g., an O ring) are fitted to the respective seal grooves 905-906. On the other hand, non-inserted portion 90b of valve housing 90 has a hexagonal head 909 formed adjacent to the side of the negative x-axis direction of external screw-threaded portion 908 (that is, seal ring 905). As a whole, non-inserted portion 90b is formed into a substantially cylindrical-hollow shape arranged coaxially with the centerline of valve-body accommodation bore 900. An internal screw-threaded portion 907 is formed on the inner peripheral side of the cylindrical-hollow non-inserted portion 90b. In a similar to the external screw-threaded portion 914 formed on the outer peripheral surface of the back end (i.e., the screw-thread portion 913) of valve body 91, lock nut 96 also has an external screw-threaded portion 960 formed on its outer peripheral surface.

The assembly work of the first valve 9a is hereunder described in detail. First, seat 93 is installed or fitted onto the abutted-engagement portion 950 of plunger 92 from the side of the positive x-axis direction, and then coil spring 94 is installed on the spring retainer 951 from the negative x-axis direction. Under these conditions, plunger 92 is installed and accommodated in the plunger-accommodation bore 910 of valve body 91. The caulked portions 911 of the outer periphery of the opening end of plunger-accommodation bore 910 are formed as four caulked portions configured to be substantially conformable to the shape of the caulked abutment portion 932 and circumferentially spaced apart from each other. The end face of valve body 91 (on the side of the positive x-axis direction), substantially corresponding to the axial position of each of the four caulked portions 911, and the end face of seat 93 (on the side of the positive x-axis direction), substantially corresponding to the axial position of the caulked abutment portion 932, are aligned with each other in the x-axis direction. Abutted-engagement portion 950 is configured to protrude from the end face of valve body 91 (or the end face of seat 93) on the side of the positive x-axis direction under the valve-closed state where plunger 92 is kept in abutted-engagement with the seat 93. The sub-assembly of valve body 91, plunger 92, seat 93, and coil spring 94, assembled as previously discussed, is accommodated in the valve-body accommodation bore 900 of valve housing 90, while the external screw-threaded portion 914 of valve body 91 is screwed into the internal screw-threaded portion 907 of valve housing 90. The axial end of valve body 91 on the side of the positive x-axis direction is configured to protrude from the axial end of valve housing 90 on the side of the positive x-axis direction, even under a state where valve body 91 is positioned substantially at the outermost position relatively to the valve housing 90 in the negative x-axis direction (see FIG. 1). The assembly of valve housing 90 and the valve-body sub-assembly, assembled as previously discussed, is installed on the housing 10, while the external screw-threaded portion 908 of valve housing 90 is screwed into an internal screw-threaded portion (i.e., a limiter-valve-mounting tapped hole) of steering housing 11. Concretely, by turning the hexagonal head 909 by means of a spanner (not shown) for example, the first valve unit (i.e., the assembly of first valve 9a, containing valve housing 90, valve body 91, plunger 92, seat 93, and coil spring 94, is screwed into the steering housing 11. The axial length of abutted-engagement portion 950 of pin 95 of the first valve 9a is dimensioned such that the tip of abutted-engagement portion 950 protrudes into the first pressure chamber 16 under a state where the first valve 9a has been installed on the steering housing 11. The axial direction of pin 95, exactly, the axial direction of abutted-engagement portion 950 of the first valve 9a is identical to the direction of sliding motion of piston 7 (rack 70), that is, the x-axis direction.

Regarding the first valve 9a installed on the housing 10 as discussed above, by screw-threaded connection of the external screw-threaded portion 914 of valve body 91 and the internal screw-threaded portion 907 of valve housing 90, rotary motion of valve body 91 can be transformed or converted into linear motion of valve body 91 relative to valve housing 90 in the longitudinal direction of valve body (i.e., in the x-axis direction). That is to say, the previously-noted screw-threaded connection enables position adjustment of valve body 91 relative to valve housing 90 in the longitudinal direction of valve body 91. Concretely, the position of valve body 91 (the first-valve assembly) relative to valve housing 90 in the x-axis direction can be easily adjusted by turning the slotted head 915 of the rearmost end of valve body 91 by means of a screw driver (not shown). With the plunger 92 kept at its initial position (the spring-loaded position) by the spring force of coil spring 94, that is, under the valve-closed state of the first valve 9a, the position of plunger 92 (pin 95) relative to valve body 91 is held constant. Hence, by adjusting the position of valve body 91 relative to housing 10 (steering housing 11) in the x-axis direction via the intermediate sleeve (valve housing 90), it is possible to adjust the position of abutted-engagement portion 950 of pin 95, which protrudes into the first pressure chamber 16, relative to housing 10 in the x-axis direction, in other words, the protruding length of pin 95 from the innermost end face of the limiter-valve-mounting tapped hole of housing 10 (steering housing 11). Additionally, by screw-threaded connection of the external screw-threaded portion 960 of lock nut 96 and the internal screw-threaded portion 907 of valve housing 90, rotary motion of lock nut 96 can be transformed or converted into linear motion of lock nut 96 relative to valve housing 90 in the x-axis direction. Thereafter, by further screwing the lock nut 96 (the external screw-threaded portion 960) into the internal screw-threaded portion 907 of valve housing 90, and by tightening and bringing the lock nut 96 into abutted-engagement with the end face of valve body 91 on the side of the negative x-axis direction to prevent loosening of the threadably-engaged portions (i.e., the external screw-threaded portion 914 of valve body 91 and the internal screw-threaded portion 907 of valve housing 90), the position of valve body 91 relative to valve housing 90 in the longitudinal direction (i.e., in the x-axis direction) can be held or fixed.

As previously described, the second valve 9b has the same construction as the first valve 9a. The axial length of abutted-engagement portion 950 of pin 95 of the second valve 9b is dimensioned such that the tip of abutted-engagement portion 950 protrudes into the gear chamber 15 (that is, the second pressure chamber 17) under a state where the second valve 9b has been installed on the steering housing 11. The axial direction of pin 95, exactly, the axial direction of abutted-engagement portion 950 of the second valve 9b is oriented to the direction of rotation of sector gear 8 so as to permit the tip of abutted-engagement portion 950 to be brought into abutted-engagement with the rightmost tooth face of sector gear 8 (see FIG. 4).

Operation of Integral Power Steering Apparatus of Embodiment

Figure 3:
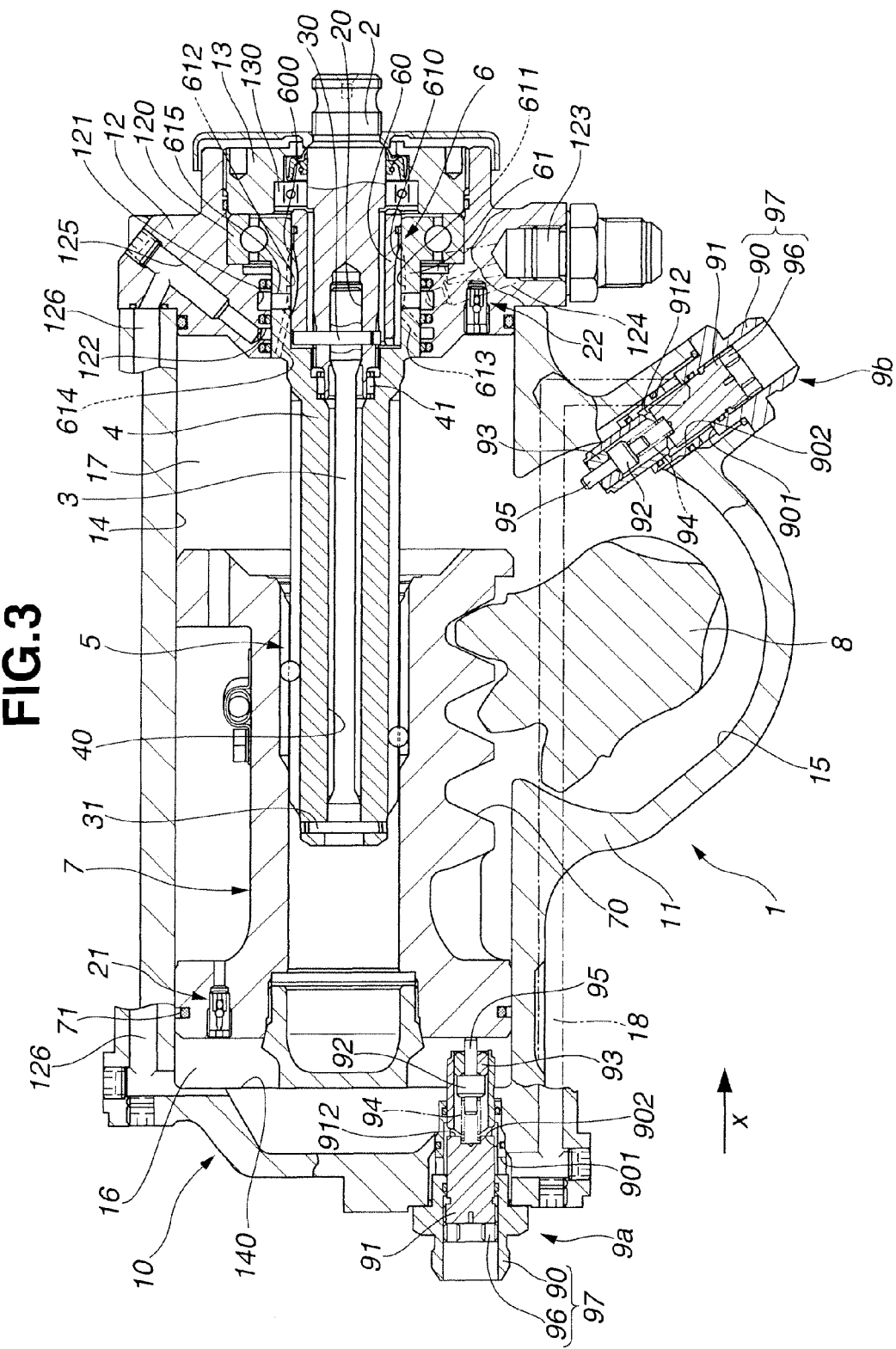
FIG. 3 is a longitudinal cross-sectional view illustrating the integral power steering apparatus of the embodiment, when a left turn is made under a state where relative-position adjustment of the limiter valve has been made after having installed the power steering apparatus on the vehicle.
Figure 4:
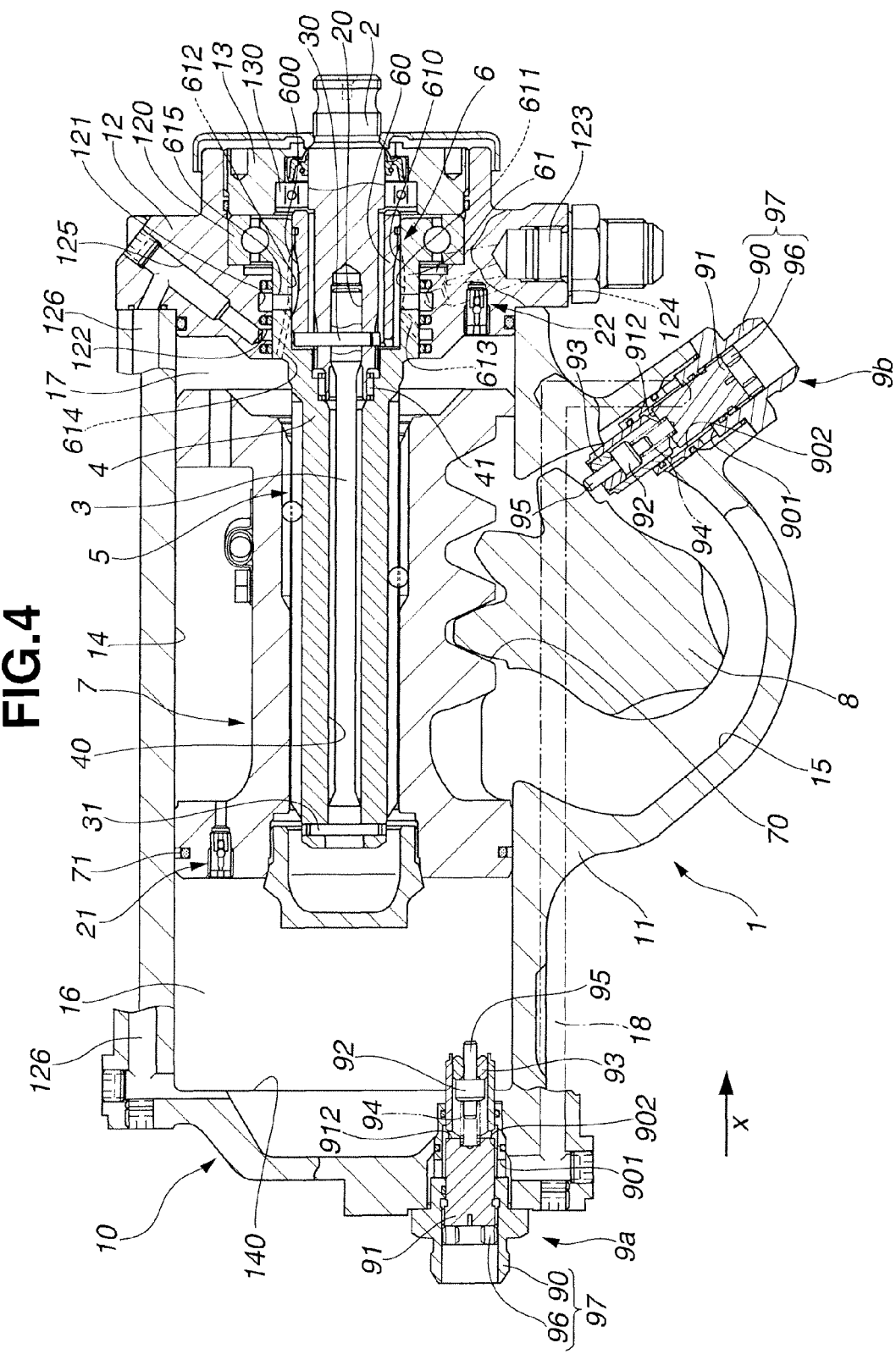
FIG. 4 is a longitudinal cross-sectional view illustrating the integral power steering apparatus of the embodiment, when a right turn is made under a state where relative-position adjustment of the limiter valve has been made after having installed the power steering apparatus on the vehicle.

Details of the operation of the stroke-limiter equipped power steering apparatus 1 of the embodiment are hereunder described in reference to the longitudinal cross sections (the explanatory views) of FIGS. 3-4.

As previously described, FIG. 1 shows the longitudinal cross section of the stroke-limiter equipped integral power steering apparatus 1 of the embodiment in a state where position adjustment of the limiter valve (each of first and second valves 9a-9b) relative to steering housing 11 is not yet made before installing the power steering apparatus 1 on the vehicle. In contrast, FIGS. 3-4 show the longitudinal cross sections of the stroke-limiter equipped power steering apparatus 1 of the embodiment in a state where position adjustment of the limiter valve (each of first and second valves 9a-9b) relative to steering housing 11 has already been made after having installed the power steering apparatus 1 on the vehicle. More concretely, FIG. 3 shows the state of power steering apparatus 1 (i.e., the axial position of piston 7 and the angular position of sector gear 8) when the steering wheel is turned in one rotation direction so that piston 7 moves toward the first pressure chamber 16, that is, in the negative x-axis direction, for example, when a left turn is made. On the other hand, FIG. 4 shows the state of power steering apparatus 1 when the steering wheel is turned in the other rotation direction so that piston 7 moves toward the second pressure chamber 17, that is, in the positive x-axis direction, for example, when a right turn is made.

Steering-Assist Function

Referring to FIG. 3, when the steering wheel is turned so that piston 7 moves toward the first pressure chamber 16 (i.e., in the negative x-axis direction), working fluid is supplied to the second pressure chamber 17 by way of the control valve 6. More concretely, working fluid discharged from the oil pump, is supplied from the inlet port 123 through the fourth oil passage 124, the first axial grooves 611, the third oil passage 615, the directional-control grooves 600, the second axial grooves 612, and the second oil passage 614 to the second pressure chamber 17. As a result, the hydraulic pressure in the second pressure chamber 17 rises, thereby providing a steering-assistance force to the piston 7 so that most of the steering effort required to move the piston 7 toward the first pressure chamber 16 is provided by the hydraulic pressure risen in the second pressure chamber 17. This reduces the driver's steering effort during a left turn. Referring to FIG. 4, conversely when the steering wheel is turned so that piston 7 moves toward the second pressure chamber 17 (i.e., in the positive x-axis direction), working fluid is supplied to the first pressure chamber 16 by way of the control valve 6. More concretely, working fluid discharged from the oil pump, is supplied from the inlet port 123 through the fourth oil passage 124, the first axial grooves 611, the third oil passage 615, the directional-control grooves 600, the first axial grooves 611, the first oil passage 613, the first-pressure-chamber side circumferential groove 122, the fifth oil passage 125, and the sixth oil passage 126 to the first pressure chamber 16. As a result of this, the hydraulic pressure in the first pressure chamber 16 rises, thereby providing a steering-assistance force to the piston 7 so that most of the steering effort required to move the piston 7 toward the second pressure chamber 17 is provided by the hydraulic pressure risen in the first pressure chamber 16. This reduces the driver's steering effort during a right turn.

Stroke-Limiter Function

As shown in FIG. 3, when the steering wheel is turned so that piston 7 moves toward the first pressure chamber 16 that is, in the negative x-axis direction, working fluid is supplied to the second pressure chamber 17 by way of the control valve 6. When the hydraulic pressure in the second pressure chamber 17 becomes higher than a predetermined pressure value, the second valve 9b becomes opened and hence the working-fluid pressure is directed to the seventh oil passage 18. At this time, there is no supply of working fluid to the first pressure chamber 16 and the hydraulic pressure in the first pressure chamber 16 becomes lower than the predetermined pressure value, and thus the first valve 9a becomes kept closed. That is, there is a supply of working fluid from the second pressure chamber 17 to the seventh oil passage 18 with the second valve 9b opened, whereas there is no working-fluid supply from the seventh oil passage 18 to the first pressure chamber 16 due to the first valve 9a closed. When the steering wheel is further turned so that piston 7 moves toward the first pressure chamber 16, the left-hand end face (viewing FIG. 3) of piston 7 is brought into abutted-engagement with the abutted-engagement portion 950 of pin 95 of the first valve 9a. When the steering wheel is still further turned in the same rotation direction, the plunger 92, together with the pin 95 (the abutted-engagement portion 950), moves in the negative x-axis direction. Thus, plunger 92 (exactly, the end face of the positive x-axis direction of large-diameter portion 920) moves in the negative x-axis direction apart from its seat surface 933. Hence, the first valve 9a becomes opened, and thus the first pressure chamber 16 communicates with the seventh oil passage 18 via the communication grooves 931 of seat 93. With the first valve 9a opened, working fluid in the second pressure chamber 17 is delivered through the seventh oil passage 18 to the first pressure chamber 16. As a result, the hydraulic pressure in the first pressure chamber 16 becomes identical to that in the second pressure chamber 17. Accordingly, a steering-assistance force that moves the piston 7 toward the first pressure chamber 16, does not act. Most of the steering effort, required to move the piston 7 toward the first pressure chamber 16, is provided by only the applied steering force (the applied steering torque) to the steering wheel by the driver, and thus an excessive leftward stroke of piston 7 can be suppressed or limited during a left turn.

In a similar manner to the stroke-limiter function of the power steering apparatus 1 during a left turn (see FIG. 3), as shown in FIG. 4, when the steering wheel is turned so that piston 7 moves toward the second pressure chamber 17 that is, in the positive x-axis direction, working fluid is supplied to the first pressure chamber 16 by way of the control valve 6. When the hydraulic pressure in the first pressure chamber 16 becomes higher than a predetermined pressure value, the first valve 9a becomes opened and hence the working-fluid pressure is directed to the seventh oil passage 18. At this time, there is no supply of working fluid to the second pressure chamber 17 and the hydraulic pressure in the second pressure chamber 17 becomes lower than the predetermined pressure value, and thus the second valve 9b becomes kept closed. That is, there is a supply of working fluid from the first pressure chamber 16 to the seventh oil passage 18 with the first valve 9a opened, whereas there is no working-fluid supply from the seventh oil passage 18 to the second pressure chamber 17 due to the second valve 9b closed. When the steering wheel is further turned so that piston 7 moves toward the second pressure chamber 17, the rightmost tooth face (viewing FIG. 4) of sector gear 8 is brought into abutted-engagement with the abutted-engagement portion 950 of pin 95 of the second valve 9b. When the steering wheel is still further turned in the same rotation direction, the plunger 92, together with the pin 95 (the abutted-engagement portion 950), is pushed in its retracted direction. Thus, plunger 92 moves in the retracted direction apart from its seat surface 933. Hence, the second valve 9b becomes opened, and thus the second pressure chamber 17 communicates with the seventh oil passage 18 via the communication grooves 931 of seat 93. With the second valve 9b opened, working fluid in the first pressure chamber 16 is delivered through the seventh oil passage 18 to the second pressure chamber 17. As a result, the hydraulic pressure in the second pressure chamber 17 becomes identical to that in the first pressure chamber 16. Accordingly, a steering-assistance force that moves the piston 7 toward the second pressure chamber 17, does not act. Most of the steering effort, required to move the piston 7 toward the second pressure chamber 17, is provided by only the applied steering force (the applied steering torque) to the steering wheel by the driver, and thus an excessive rightward stroke of piston 7 can be suppressed or limited during a right turn.

Position Adjustment Function

When adjusting the position of pin 95 (abutted-engagement portion 950) of the first valve 9a after having installed the power steering apparatus 1 on the vehicle, the steering wheel is turned (anticlockwise on a left turn) immediately before the steering linkage of the pitman arm, which arm is mechanically linked to the sector gear 8, is brought into abutment with a link stopper (not shown), in other words, immediately before the maximum anticlockwise steering-wheel movement has been reached. Under this condition, the position of pin 95 (abutted-engagement portion 950) relative to the steering housing 11 is determined. The axial position of piston 7, immediately before the steering linkage of the pitman arm has been brought into abutment with the link stopper, while turning the steering wheel anticlockwise and moving the piston 7 in the negative x-axis direction, that is, in the direction for decreasing the volumetric capacity of the first pressure chamber 16, is hereinafter referred to as "first predetermined piston position". More concretely, the position of valve body 91 relative to housing 10 (that is, valve housing 90) in the x-axis direction is adjusted by turning the slotted head 915 of the rearmost end of valve body 91 in the direction for loosening by the screw driver, such that the first valve 9a becomes kept in its valve-closed state, in other words, plunger 92 becomes seated on its seat 93, when piston 7 is positioned in the previously-noted first predetermined piston position and simultaneously abuts with the pin 95 (the abutted-engagement portion 950). Alternatively, the position of valve body 91 relative to housing 10 (that is, valve housing 90) in the x-axis direction is adjusted by turning the slotted head 915 of the rearmost end of valve body 91 in the direction for tightening by the screw driver until such time that pin 95 (abutted-engagement portion 950) of the first valve 9a, which is kept in its valve-closed state, is brought into abutment with the piston 7, positioned in the first predetermined piston position. By virtue of the position adjustment of valve body 91 (i.e., abutted-engagement portion 950 of pin 95 of the first valve 9a) relative to housing 10 (i.e., valve housing 90) as discussed above, piston 7 can be brought into abutted-engagement with the pin 95 (the abutted-engagement portion 950) immediately before the steering linkage comes into abutment with the link stopper, thereby opening the first valve 9a. Thus, a steering-assistance force, produced by the working-fluid pressure to move the piston 7 in the negative x-axis direction, that is, in the direction for decreasing the volumetric capacity of the first pressure chamber 16, does not act on the piston. This suppresses the steering linkage from being undesirably damaged.

In a similar manner to the position adjustment method of valve body 91 of the first valve 9a (i.e., abutted-engagement portion 950 of pin 95 of the first valve 9a) relative to housing 10, position adjustment of valve body 91 of the second valve 9b (i.e., abutted-engagement portion 950 of pin 95 of the second valve 9b) relative to housing 10 can be made. That is, when adjusting the position of pin 95 (abutted-engagement portion 950) of the second valve 9b, the steering wheel is turned (clockwise on a right turn) so as to move the piston 7 in the positive x-axis direction, that is, in the direction for decreasing the volumetric capacity of the second pressure chamber 17, immediately before the steering linkage of the pitman arm, which arm is mechanically linked to the sector gear 8, is brought into abutment with a link stopper (not shown), in other words, immediately before the maximum clockwise steering-wheel movement has been reached. The axial position of piston 7, immediately before the steering linkage of the pitman arm has been brought into abutment with the link stopper, while turning the steering wheel clockwise and moving the piston 7 in the positive x-axis direction, that is, in the direction for decreasing the volumetric capacity of the second pressure chamber 17 and simultaneously approaching the rightmost tooth face of sector gear 8 closer to the tip of abutted-engagement portion 950 of pin 95 of the second valve 9b, is hereinafter referred to as "second predetermined piston position". More concretely, the position of valve body 91 relative to housing 10 (that is, valve housing 90) in the x-axis direction is adjusted by turning the slotted head 915 of the rearmost end of valve body 91 in the direction for tightening by the screw driver until such time that pin 95 (abutted-engagement portion 950) of the second valve 9b, which is kept in its valve-closed state, is brought into abutment with the rightmost tooth face of sector gear 8 under a specified state where the piston 7 has been positioned in the second predetermined piston position. By virtue of the position adjustment of valve body 91 (i.e., abutted-engagement portion 950 of pin 95 of the second valve 9b) relative to housing 10 (i.e., valve housing 90) as discussed above, piston 7 can be brought into abutted-engagement with the pin 95 (the abutted-engagement portion 950) immediately before the steering linkage comes into abutment with the link stopper, thereby opening the second valve 9b. Thus, a steering-assistance force, produced by the working-fluid pressure to move the piston 7 in the positive x-axis direction, that is, in the direction for decreasing the volumetric capacity of the second pressure chamber 17, does not act on the piston. This suppresses the steering linkage from being undesirably damaged.

As discussed previously, valve body 91 of limiter valve 9 (each of first and second valves 9a-9b) is configured such that the position of valve body 91 relative to housing 10 in the longitudinal direction of valve body 91 is adjustable. Hence, the valve-open position of limiter valve 9 can be easily but precisely adjusted for each and every integral power steering apparatus 1 (or depending on the type of vehicle and/or the size of tires the automotive vehicles use). Therefore, it is possible to easily precisely adjust the limiter-valve-open position, in a manner so as to match several steered-road-wheel movement ranges of automotive vehicles on which power steering apparatus 1 is mounted, that is, depending on several steering-wheel movement ranges and/or steered-road-wheel movement ranges. In the shown embodiment, as previously discussed, the position adjustment of valve body 91 of limiter valve 9 relative to housing 10 can be achieved within a permissible valve-open position range in which the steering linkage can be prevented or suppressed from being undesirably damaged. Additionally, in the shown embodiment, due to individual position-adjustment functions of first and second valves 9a-9b, it is possible to adjust the limiter-valve-open position individually in leftward and rightward steering directions, respectively.

In the shown embodiment, seat 93 is formed as a separate component part, separated from the valve body 91. In lieu thereof, seat 93 is formed integral with the valve body 91. Also, the structure of seat 93 (i.e., the structure of communication grooves 931) and/or the structure of plunger 92 is not limited to the particular embodiment shown and described herein, but that various changes and modifications may be made. For instance, instead of press-fitting the pin 95 into the axially-extending central bore of large-diameter portion 920, the small-diameter rod portion of pin 95 and the large-diameter portion 920 may be formed integral with each other.

In the shown embodiment, valve housing 90 (the intermediate sleeve) is formed separately from the housing 10. By the provision of the intermediate sleeve (valve housing 90), it is possible to easily form a valve-body accommodating structure (i.e., valve-body accommodation bore 900) and simultaneously to easily form a position adjustment structure for adjusting the position of valve body 91 relative to housing 10. That is, housing 10 is a component part having a greater size/dimension as compared to the limiter valve 9, and generally formed by casting, for example. As a matter of course, it is difficult to produce the housing of a complicated structure. For the reasons discussed above, in the shown embodiment, as a separate part, separated from the housing 10, the intermediate sleeve (valve housing 90) is provided or interposed between the housing 10 and the valve body 91. By virtue of the provision of the intermediate sleeve (valve housing 90), it is possible to more easily but accurately form small-size but complicated structures, such as the valve-body accommodating structure (i.e., valve-body accommodation bore 900 for accommodating therein the valve body 91) and the internal screw-threaded portion 907 (the position adjustment structure) for adjusting the position of valve body 91 relative to housing 10 by forming them in the valve housing 90 (the intermediate sleeve) rather than in the housing 10.

As discussed previously, in the case that valve housing 90 is formed separately from the housing 10, it is a problem how a fluid-communication oil passage (i.e., the seventh oil passage 18) formed in the housing 10 and the plunger-accommodation bore 910 formed in the valve body 91 are communicated with each other. In the shown embodiment, radial through hole 912, through which the plunger-accommodation bore 910 and the outer peripheral side of valve body 91 are communicated with each other, is formed in the valve body 91. On the other hand, radial through hole 901, which is configured to communicate on the inner peripheral side of valve housing 90 with the radial through hole 912 of valve body 91 and also configured to communicate on the outer peripheral side of valve housing 90 with the seventh oil passage 18, is formed in the valve housing 90. This ensures the simplified fluid-communication structure and the more compact power steering apparatus 1. That is, the axially-extending valve-body accommodation bore 900 is formed on the inner peripheral side of valve housing 90, whereas the axially-extending plunger-accommodation bore 910 is formed on the inner peripheral side of valve body 91, accommodated in the valve-body accommodation bore 900. Hence, it is possible to provide the fluid-communication passage, through which the plunger-accommodation bore 910 and the seventh oil passage 18 are communicated with each other, by providing (forming) the radial through hole 901 in the valve housing 90 in a manner so as to connect the radial through hole 901 to the seventh oil passage 18, and by providing (forming) the radial through hole 912 in the valve body 91 in a manner so as to connect the radial through hole 912 to the plunger-accommodation bore 910, and by achieving fluid-communication between the radial through hole 901 and the radial through hole 912. Therefore, even in the case that valve housing 90 is formed separately from the housing 10, the stroke-limiter equipped power steering apparatus 1 of the embodiment requires only the machining work of radial through holes 901 and 912 to be formed in valve housing 90 and valve body 91, respectively, for the purpose of providing the previously-noted fluid-communication passage. This eliminates the necessity of providing a specific pipe arrangement, thus ensuring the simplified fluid-communication structure and the more compact power steering apparatus 1.

However, in providing the previously-noted fluid-communication passage by means of the radial through holes 901 and 912 formed in the valve housing 90 and the valve body 91, respectively, as a matter of course, a certain fluid-communication structure is required. For instance, the certain fluid-communication structure can be provided as a communication groove formed in the inner peripheral surface of valve housing 90 (i.e., valve-body accommodation bore 900) or a communication groove formed in the outer peripheral surface of valve body 91. In the shown embodiment, communication groove 902, which is formed in the inner peripheral surface of valve housing 90 (i.e., valve-body accommodation bore 900), is used as the fluid-communication structure for the radial through holes 901 and 912. In the case of the communication groove 902 formed in the inner peripheral surface of valve housing 90 rather than the communication groove formed in the outer peripheral surface of valve body 91, it is possible to suppress the axial length of valve housing 90 from being undesirably lengthened, for the reasons discussed below. That is, valve body 91 is configured to be axially displaced relatively to the valve housing 90 for position adjustment of valve body 91 relative to valve housing 90. It is necessary for the communication groove to communicate with both the radial through hole 901 and the radial through hole 912 over the entire axial-displacement range of valve body 91 relative to valve housing 90. Fully taking account of the entire axial-displacement range of valve body 91, the axial length of the communication groove has to be appropriately determined. In contrast to the communication groove 902 formed in the inner peripheral surface of valve housing 90, suppose that the communication groove is formed in the outer peripheral surface of valve body 91. For instance, when valve body 91 is positioned at the outermost position relatively to the valve housing 90 in the negative x-axis direction, as can be appreciated from the cross section of FIG. 2, it is necessary to avoid the axial end of the communication groove on the side of the negative x-axis direction from overlapping (interfering) with the position adjustment structure (i.e., the internal screw-threaded portion 907 of valve housing 90 and the external screw-threaded portion 914 of valve body 91 threadably engaged with each other). Conversely when valve body 91 is positioned at the innermost position relatively to the valve housing 90 in the positive x-axis direction, as can be appreciated from the cross section of FIG. 2, it is necessary to avoid the other axial end of the communication groove on the side of positive x-axis direction from communicating with the first pressure chamber 16. To satisfy the previously-discussed necessary conditions, in the case of the communication groove formed in the outer peripheral surface of valve body 91, the entire length (in the x-axis direction) of valve housing 90 itself must be lengthened. In contrast to the above, in the embodiment, the communication groove 902 is formed in the inner peripheral surface of valve housing 90. This eliminates the necessity for an excessively long valve housing 90. That is, the limiter valve 9 of stroke-limiter equipped power steering apparatus 1 of the embodiment requires only the appropriate setting of the axial length of communication groove 902 to be formed in the valve-body accommodation bore 900, substantially corresponding to the entire axial displacement of valve body 91 (in other words, the entire axial displacement of radial through hole 912). Hence, it is possible to suppress the axial length of valve housing 90 from being undesirably lengthened. This contributes to the appropriately reduced axial length of limiter valve 9. By the way, the radial through hole 901 of valve housing 90 may be formed in any axial position within the range of formation of the communication groove 902. In the shown embodiment, the radial through hole 901 of valve housing 90 is arranged at the axial end (the left-hand end, viewing FIG. 2) of communication groove 902 on the side of the negative x-axis direction, and thus arranged near the external screw-threaded portion 914 of valve body 91. This facilitates the radial connection between the radial through hole 901 and the seventh oil passage 18, thus contributing to the appropriately reduced axial length of valve housing 90.

By the way, the position adjustment of valve body 91 (i.e., abutted-engagement portion 950 of pin 95 of limiter valve 9) relative to housing 10 (i.e., valve housing 90) can be achieved by press-fitting the valve body 91 into the housing 10 (the valve housing 90) and by appropriately adjusting the press-fit length, or achieved by screw-threaded connection of the external screw-threaded portion 914 of valve body 91 and the internal screw-threaded portion 907 of housing 10 (valve housing 90). The integral power steering apparatus 1 of the embodiment uses the latter position-adjustment method. That is, in the embodiment, the position of valve body 91 (i.e., abutted-engagement portion 950 of pin 95 of limiter valve 9) relative to housing 10 (i.e., valve housing 90) is adjusted by screw-threaded connection of the external screw-threaded portion 914 of valve body 91 and the internal screw-threaded portion 907 of housing 10 (valve housing 90). As compared to press-fitting, screw-threaded connection contributes to the enhanced strength of installation of valve body 91 on housing 10, and also contributes to easy but precise position adjustment of valve body 91 relative to housing 10.

Furthermore, in the shown embodiment, lock nut 96 is also provided for holding or locking the position of valve body 91 relative to housing 10 (valve housing 90) in the longitudinal direction after position-adjustment has been completed, thus preventing undesirable loosening of the threadably-engaged portions (i.e., the external screw-threaded portion 914 of valve body 91 and the internal screw-threaded portion 907 of valve housing 90), in other words, an accidental travel (displacement) of valve body 91 from the already-adjusted position. In the shown embodiment, lock nut 96 is formed into an annular (cylindrical-hollow) shape so as to permit the slotted head 915 of valve body 91 to be turned by means of a screw driver without removing the lock nut 96. This contributes to the enhanced workability of position adjustment of valve body 91 relative to housing 10. It will be appreciated that the structure of lock nut 96 is not limited to the particular embodiment shown and described herein, but various changes and modifications may be made. For the purpose of lower power-steering-system installation time and costs, lock nut 96 may be eliminated.

Figure 5:
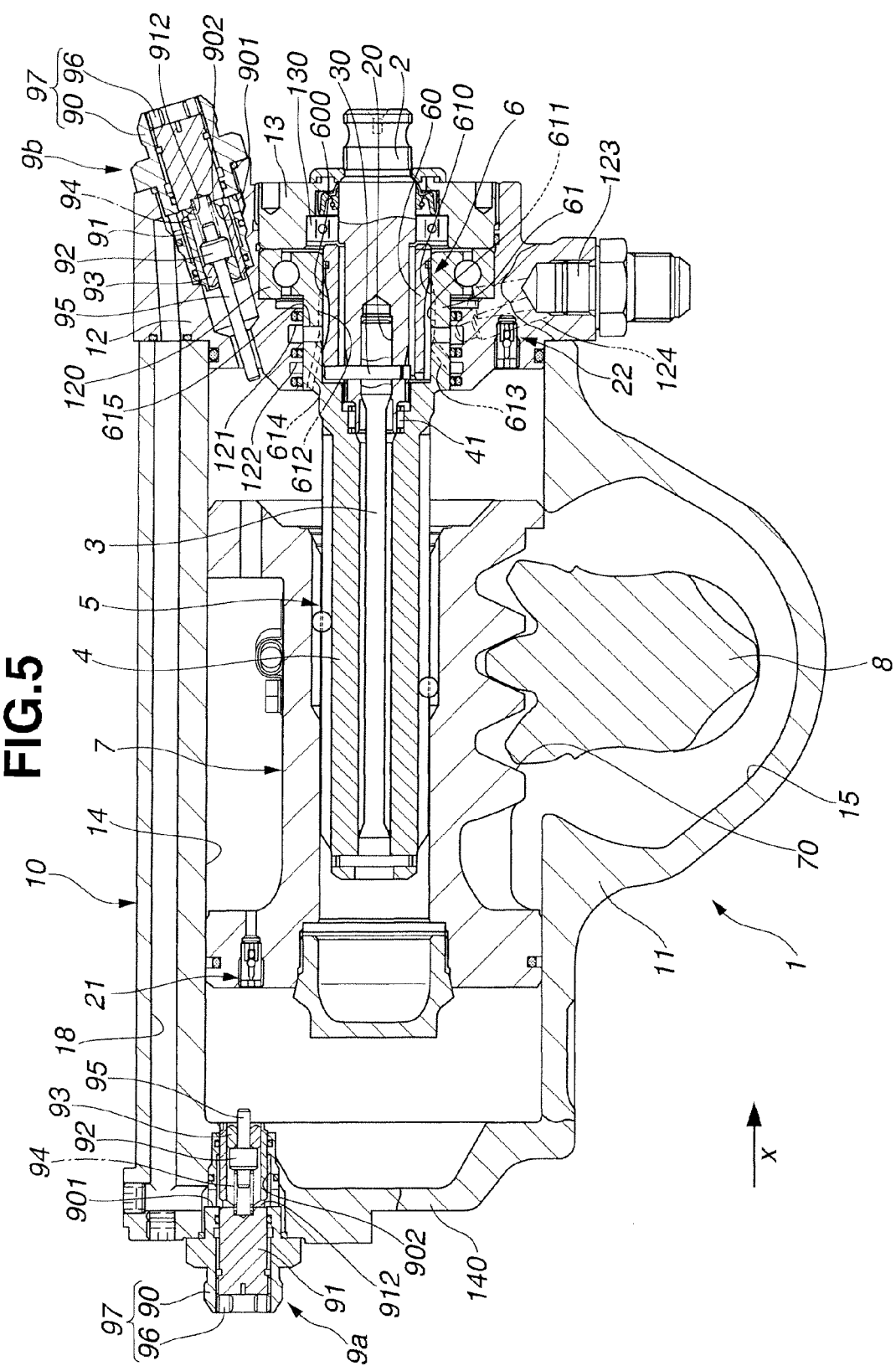
FIG. 5 is a longitudinal cross-sectional view illustrating a modified stroke-limiter equipped integral power steering apparatus.

By the way, the layout of each of first and second valves 9a-9b is not limited to the particular embodiment shown and described herein, but various changes and modifications may be made. In the embodiment shown in FIG. 1, the first valve 9a is installed on the steering housing 11 so as to face the first pressure chamber 16, whereas the second valve 9b is installed on the steering housing 11 so as to face the gear chamber 15. The longitudinal cross section of FIG. 5 shows another layout of first and second valves 9a-9b. As seen in FIG. 5, the second valve 9b may be installed on the valve housing 12, which valve housing is configured to accommodate therein the control valve 6, rather than on the steering housing 11, in such a manner that the abutted-engagement portion 950 (pin 95) of the second valve 9b is brought into abutted-engagement with the right-hand end face (see FIG. 5) of piston 7 rather than with the rightmost tooth face (see FIG. 4) of sector gear 8. When installing the second valve 9b on the valve housing 12, it is preferable that the axis of the second valve 9b is inclined with respect to the rotation axis of input shaft 2 (or the direction of linear motion of piston 7), that is, with respect to the x-axis direction. The inclined layout of the second valve 9b contributes to the enhanced degree of freedom of installation (layout) of the second valve 2b on the valve housing 12, and consequently contributes to the compact integral power steering apparatus 1.

Effects of Integral Power Steering Apparatus of Embodiment

The effects, provided by the integral power steering apparatus 1 of the embodiment, are hereunder enumerated.

(1) An integral power steering apparatus of the embodiment includes a housing 10 (steering housing 11 and valve housing 12), an input shaft 2 adapted to be connected to a steering wheel, a piston 7 slidably accommodated in the housing 10 and configured to partition an internal space of the housing 10 into a first pressure chamber 16 and a second pressure chamber 17, a first motion converter (ball-screw mechanism 5) interposed between the input shaft 2 and the piston 7 for converting rotary motion of the input shaft 2 into linear motion of the piston 7, a second motion converter including a rack 70 integrally formed on an outer periphery of the piston 7 and a sector gear 8 kept in meshed-engagement with the rack 70 for converting linear motion of the rack 70 into rotary motion and arranged in the second pressure chamber 17, a control valve 6 configured to selectively supply working fluid, fed from an external working-fluid pressure source (e.g., an oil pump), into either one of the first and second pressure chambers 16-17, a motion transmitter (a pitman arm) adapted to transmit a movement of the sector gear 8 about a rotation axis to a steered road wheel, a first valve 9a configured to direct working-fluid pressure in the second pressure chamber 17 to the first pressure chamber 16, when the piston 7 reaches a first predetermined position in a direction for decreasing a volumetric capacity of the first pressure chamber 16, and a second valve 9b configured to direct working-fluid pressure in the first pressure chamber 16 to the second pressure chamber 17, when the piston 7 reaches a second predetermined position in a direction for decreasing a volumetric capacity of the second pressure chamber 17. The first valve 9a is installed on the housing 10 in such a manner as to face the first pressure chamber 16. The first valve 9a is comprised of a first valve body 91 having a first plunger-accommodation bore 910 formed therein, a first plunger 92 housed in the first plunger-accommodation bore 910 in such a manner as to retract or extend in a longitudinal direction of the first valve body 91, a first seat 93 installed on the first valve body 91 in such a manner as to construct a part (communication grooves 931) of a first communication passage through which the first and second pressure chambers 16-17 can be communicated with each other, and configured to prevent working-fluid flow through the first communication passage (communication grooves 931) with the first plunger 92 abutted on the first seat 93, and further configured to permit working-fluid flow through the first communication passage (communication grooves 931) with the first plunger 92 moved apart from the first seat 93, a first biasing member (coil spring 94) provided for permanently biasing the first plunger 92 toward the first seat 93, a first abutted-engagement portion (pin 95) attached to the first plunger 92 in such a manner as to protrude from the first seat 93 toward the first pressure chamber 16, and configured to be brought into abutted-engagement with a first abutment portion corresponding to one end face of the piston 7 when the first predetermined position of the piston 7 is reached, and further configured to move together with the first plunger 92 by a push of the first abutment portion, thereby causing the first plunger 92 to be spaced apart from the first seat 93 to permit the first pressure chamber 16 to be communicated with the second pressure chamber 17 through the first communication passage, and a first intermediate sleeve (a first valve housing 90) formed separately from the housing 10. The first valve body 91 of the first valve 9a is configured to enable a position of the first valve body 91 relative to the housing 10 to be adjusted in the longitudinal direction of the first valve body 91 via the first intermediate sleeve (the first valve housing 90). On the other hand, the second valve 9b is installed on the housing 10 in such a manner as to face the second pressure chamber 17. The second valve 9b is comprised of a second valve body 91 having a second plunger-accommodation bore 910 formed therein, a second plunger 92 housed in the second plunger-accommodation bore 910 in such a manner as to retract or extend in a longitudinal direction of the second valve body 91, a second seat 93 installed on the second valve body 91 in such a manner as to construct a part (communication grooves 931) of a second communication passage through which the first and second pressure chambers 16-17 can be communicated with each other, and configured to prevent working-fluid flow through the second communication passage (communication grooves 931) with the second plunger 92 abutted on the second seat 93, and further configured to permit working-fluid flow through the second communication passage (communication grooves 931) with the second plunger 92 moved apart from the second seat 93, a second biasing member (coil spring 94) provided for permanently biasing the second plunger 92 toward the second seat 93, a second abutted-engagement portion (pin 95) attached to the second plunger 92 in such a manner as to protrude from the second seat 93 toward the second pressure chamber 17, and configured to be brought into abutted-engagement with a second abutment portion corresponding to either one of the other end face of the piston 7 and the sector gear 8 when the second predetermined position of the piston 7 is reached, and further configured to move together with the second plunger 92 by a push of the second abutment portion, thereby causing the second plunger 92 to be spaced apart from the second seat 93 to permit the second pressure chamber 17 to be communicated with the first pressure chamber 16 through the second communication passage, and a second intermediate sleeve (a second valve housing 90) formed separately from the housing 10. The second valve body 91 of the second valve 9b is configured to enable a position of the second valve body 91 relative to the housing 10 to be adjusted in the longitudinal direction of the second valve body 91 via the second intermediate sleeve (the second valve housing 90).

Hence, the valve-open position of limiter valve 9 can be easily but precisely adjusted for each and every integral power steering apparatus 1 (or depending on the type of vehicle and/or the size of tires the automotive vehicles use). Therefore, it is possible to properly limit or suppress an assisting force (an assisting pressure, in other words, a piston stroke) in a manner so as to match several steered-road-wheel movement ranges of automotive vehicles on which power steering apparatus 1 is mounted.

(2) The integral power steering apparatus 1 of the embodiment further includes a first valve-position adjuster (especially, the first valve housing 90) formed separately from the housing 10, and interposed between the housing 10 and the first valve body 91, and having a first valve-body accommodation bore 900 formed therein for accommodating the first valve body 91, and a second valve-position adjuster 97 (especially, the second valve housing 90) formed separately from the housing 10, and interposed between the housing 10 and the second valve body 91, and having a second valve-body accommodation bore 900 formed therein for accommodating the second valve body 91. The first valve-position adjuster of the first valve 9a includes the first intermediate sleeve (the first valve housing 90), and the second valve-position adjuster of the second valve 9b includes the second intermediate sleeve (the second valve housing 90).

Thus, it is possible to easily form or manufacture a valve-body accommodating structure for accommodating therein the valve body 91.

(3) The first valve body 91 of the first valve 9a has a first valve-body through hole 912 through which the first plunger-accommodation bore 910 and an outer peripheral side of the first valve body 91 are communicated with each other. The first valve-position adjuster (the first valve housing 90) has a first valve-position-adjuster through hole 901 configured to communicate on an inner peripheral side of the first valve-position adjuster with the first valve-body through hole 912 and further configured to communicate on an outer peripheral side of the first valve-position adjuster with the second pressure chamber 17. The second valve body 91 of the second valve 9b has a second valve-body through hole 912 through which the second plunger-accommodation bore 910 and an outer peripheral side of the second valve body 91 are communicated with each other. The second valve-position adjuster (the second valve housing 90) has a second valve-position-adjuster through hole 901 configured to communicate on an inner peripheral side of the second valve-position adjuster with the second valve-body through hole 912 and further configured to communicate on an outer peripheral side of the second valve-position adjuster with the first pressure chamber 16.

This contributes to the simplified fluid-communication structure, thus ensuring the compact integral power steering apparatus.

(4) The first valve-position adjuster (the first valve housing 90) has a first communication groove 902 formed on the inner peripheral side of the first valve-position adjuster, and a first pair of seal members 981-982 located on both sides of the first communication groove 902 in the longitudinal direction of the first valve body 91 to seal between the first valve-position adjuster and the first valve body 91. One end of the first communication groove 902 is formed to extend to such an extent that the one end of the first communication groove 902 is opposed to the first valve-body through hole 912 under a state where the first valve body 91 is positioned substantially at its outermost position relatively to the first valve-position adjuster in the longitudinal direction of the first valve body 91. The other end of the first communication groove 902 is formed to extend to such an extent that the other end of the first communication groove 902 is opposed to the first valve-body through hole 912 under a state where the first valve body 91 is positioned substantially at its innermost position relatively to the first valve-position adjuster in the longitudinal direction of the first valve body 91. In a similar manner, the second valve-position adjuster (the second valve housing 90) has a second communication groove 902 formed on the inner peripheral side of the second valve-position adjuster, and a second pair of seal members 981-982 located on both sides of the second communication groove 902 in the longitudinal direction of the second valve body 91 to seal between the second valve-position adjuster and the second valve body 91. One end of the second communication groove 902 is formed to extend to such an extent that the one end of the second communication groove 902 is opposed to the second valve-body through hole 912 under a state where the second valve body 91 is positioned substantially at its outermost position relatively to the second valve-position adjuster in the longitudinal direction of the second valve body 91. The other end of the second communication groove 902 is formed to extend to such an extent that the other end of the second communication groove 902 is opposed to the second valve-body through hole 912 under a state where the second valve body 91 is positioned substantially at its innermost position relatively to the second valve-position adjuster in the longitudinal direction of the second valve body 91.

Hence, it is possible to suppress the axial length of valve housing 90 of each of first and second limiter valves 9a-9b from being undesirably lengthened. This contributes to the compactly-designed limiter valve 9.

(5) The first valve-position adjuster (the first valve housing 90) has a first internal screw-threaded portion 907 formed on the inner peripheral side of the first valve-position adjuster, whereas the first valve body 91 has a first external screw-threaded portion 914 formed on the outer peripheral side of the first valve body 91 and configured to permit conversion of rotary motion of the first valve body 91 into linear motion of the first valve body 91 by screw-threaded connection of the first external screw-threaded portion 914 with the first internal screw-threaded portion 907. On the other hand, the second valve-position adjuster (the second valve housing 90) has a second internal screw-threaded portion 907 formed on the inner peripheral side of the second valve-position adjuster, whereas the second valve body 91 has a second external screw-threaded portion 914 formed on the outer peripheral side of the second valve body 91 and configured to permit conversion of rotary motion of the second valve body 91 into linear motion of the second valve body 91 by screw-threaded connection of the second external screw-threaded portion 914 with the second internal screw-threaded portion 907.

Hence, the screw-threaded connection between the external screw-threaded portion 914 of valve body 91 and the internal screw-threaded portion 907 of the valve-position adjuster (the intermediate sleeve, i.e., valve housing 90) ensures easy but precise position-adjustment of valve body (pin 95) relative to housing 10 (valve housing 90).

(6) The first valve-position adjuster 97 further includes a first lock nut 96 for holding the position of the first valve body 91 in the longitudinal direction of the first valve body 91, and the second valve-position adjuster 97 further includes a second lock nut 96 for holding the position of the second valve body 91 in the longitudinal direction of the second valve body 91.

Hence, after position-adjustment of valve body 91 relative to housing 10 (valve housing 90) has been completed, it is possible to prevent undesirable loosening of the threadably-engaged portions (i.e., the external screw-threaded portion 914 of valve body 91 and the internal screw-threaded portion 907 of valve housing 90), in other words, an accidental travel (displacement) of valve body 91 from the already-adjusted position.

(7) The housing 10 has a first limiter-valve-mounting tapped hole for the first valve 9a (the first stroke limiter). The first valve-position adjuster (the first valve housing 90) has a first external screw-threaded portion 908 formed on the outer peripheral side of the first valve-position adjuster and configured to permit conversion of rotary motion of the first valve-position adjuster into linear motion of the first valve-position adjuster by screw-threaded connection of the first external screw-threaded portion 908 with the first limiter-valve-mounting tapped hole. Also, the housing 10 has a second limiter-valve-mounting tapped hole for the second valve 9b (the second stroke limiter). The second valve-position adjuster (the second valve housing 90) has a second external screw-threaded portion 908 formed on the outer peripheral side of the second valve-position adjuster and configured to permit conversion of rotary motion of the second valve-position adjuster into linear motion of the second valve-position adjuster by screw-threaded connection of the second external screw-threaded portion 908 with the second limiter-valve-mounting tapped hole.

Therefore, by interleaving a spacer of a given thickness between the outermost end face of the limiter-valve-mounting tapped hole of the housing 10 and the hexagonal head 909 of valve housing 90, and by screw-threaded connection between the external screw-threaded portion 908 of valve housing 90 and the limiter-valve-mounting tapped hole of housing 10 as well as by screw-threaded connection between the external screw-threaded portion 914 of valve body 91 and the internal screw-threaded portion 907 of valve housing 90, it is possible to more effectively increase an adjusting allowance of the valve-open position of the stroke limiter (limiter valve 9), thus ensuring easy but precise position-adjustment of valve body 91 (pin 95) relative to housing 10 (valve housing 90) and also enabling the increased applicability to various vehicle types and/or tire sizes.

The entire contents of Japanese Patent Application No. 2011-180132 (filed Aug. 22, 2011) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An integral power steering apparatus comprising:
a housing;
an input shaft adapted to be connected to a steering wheel;
a piston slidably accommodated in the housing and configured to partition an internal space of the housing into a first pressure chamber and a second pressure chamber;
a first motion converter interposed between the input shaft and the piston for converting rotary motion of the input shaft into linear motion of the piston;
a second motion converter including a rack integrally formed on an outer periphery of the piston and a sector gear kept in meshed-engagement with the rack for converting linear motion of the rack into rotary motion and arranged in the second pressure chamber;
a control valve configured to selectively supply working fluid, fed from an external working-fluid pressure source, into either one of the first and second pressure chambers;
a motion transmitter adapted to transmit a movement of the sector gear about a rotation axis to a steered road wheel;
a first valve configured to direct working-fluid pressure in the second pressure chamber to the first pressure chamber, when the piston reaches a first predetermined position in a direction for decreasing a volumetric capacity of the first pressure chamber; and
a second valve configured to direct working-fluid pressure in the first pressure chamber to the second pressure chamber, when the piston reaches a second predetermined position in a direction for decreasing a volumetric capacity of the second pressure chamber;
the first valve installed on the housing in such a manner as to face the first pressure chamber, the first valve comprising:
a first valve body having a first plunger-accommodation bore formed therein;

a first plunger housed in the first plunger-accommodation bore in such a manner as to retract or extend in a longitudinal direction of the first valve body;

a first seat installed on the first valve body in such a manner as to construct a part of a first communication passage through which the first and second pressure chambers can be communicated with each other, and configured to prevent working-fluid flow through the first communication passage with the first plunger abutted on the first seat, and further configured to permit working-fluid flow through the first communication passage with the first plunger moved apart from the first seat;

a first biasing member provided for permanently biasing the first plunger toward the first seat;

a first abutted-engagement portion attached to the first plunger in such a manner as to protrude from the first seat toward the first pressure chamber, and configured to be brought into abutted-engagement with a first abutment portion corresponding to one end face of the piston when the first predetermined position of the piston is reached, and further configured to move together with the first plunger by a push of the first abutment portion, thereby causing the first plunger to be spaced apart from the first seat to permit the first pressure chamber to be communicated with the second pressure chamber through the first communication passage; and a first valve-position adjuster comprising a first intermediate sleeve formed separately from the housing, and interposed between the housing and the first valve body, and having a first valve-body accommodation bore formed therein for accommodating the first valve body;

the second valve installed on the housing in such a manner as to face the second pressure chamber, the second valve comprising:

a second valve body having a second plunger-accommodation bore formed therein;

a second plunger housed in the second plunger-accommodation bore in such a manner as to retract or extend in a longitudinal direction of the second valve body;

a second seat installed on the second valve body in such a manner as to construct a part of a second communication passage through which the first and second pressure chambers can be communicated with each other, and configured to prevent working-fluid flow through the second communication passage with the second plunger abutted on the second seat, and further configured to permit working-fluid flow through the second communication passage with the second plunger moved apart from the second seat;

a second biasing member provided for permanently biasing the second plunger toward the second seat;

a second abutted-engagement portion attached to the second plunger in such a manner as to protrude from the second seat toward the second pressure chamber, and configured to be brought into abutted-engagement with a second abutment portion corresponding to either one of the other end face of the piston and the sector gear when the second predetermined position of the piston is reached, and further configured to move together with the second plunger by a push of the second abutment portion, thereby causing the second plunger to be spaced apart from the second seat to permit the second pressure chamber to be communicated with the first pressure chamber through the second communication passage; and a second valve-position adjuster comprising a second intermediate sleeve formed separately from the housing, and interposed between the housing and the second valve body, and having a second valve-body accommodation bore formed therein for accommodating the second valve body, wherein the first valve body of the first valve is configured to enable a position of the first valve body relative to the housing to be adjusted in the longitudinal direction of the first valve body via the first intermediate sleeve, and the second valve body of the second valve is configured to enable a position of the second valve body relative to the housing to be adjusted in the longitudinal direction of the second valve body via the second intermediate sleeve, wherein the first valve body of the first valve has a first valve-body through hole through which the first plunger-accommodation bore and an outer peripheral side of the first valve body are communicated with each other, the first valve-position adjuster has a first valve-position-adjuster through hole configured to communicate on an inner peripheral side of the first valve-position adjuster with the first valve-body through hole and further configured to communicate on an outer peripheral side of the first valve-position adjuster with the second pressure chamber, the second valve body of the second valve has a second valve-body through hole through which the second plunger-accommodation bore and an outer peripheral side of the second valve body are communicated with each other, and the second valve-position adjuster has a second valve-position-adjuster through hole configured to communicate on an inner peripheral side of the second valve-position adjuster with the second valve-body through hole and further configured to communicate on an outer peripheral side of the second valve-position adjuster with the first pressure chamber.

2. The integral power steering apparatus as claimed in claim 1, wherein:

the first valve-position adjuster has a first communication groove formed on the inner peripheral side of the first valve-position adjuster, and a first pair of seal members located on both sides of the first communication groove in the longitudinal direction of the first valve body to seal between the first valve-position adjuster and the first valve body, one end of the first communication groove being formed to extend to such an extent that the one end of the first communication groove is opposed to the first valve-body through hole under a state where the first valve body is positioned substantially at its outermost position relatively to the first valve-position adjuster in the longitudinal direction of the first valve body, and the other end of the first communication groove being formed to extend to such an extent that the other end of the first communication groove is opposed to the first valve-body through hole under a state where the first valve body is positioned substantially at its innermost position relatively to the first valve-position adjuster in the longitudinal direction of the first valve body; and the second valve-position adjuster has a second communication groove formed on the inner peripheral side of the second valve-position adjuster, and a second pair of seal members located on both sides of the second communication groove in the longitudinal direction of the second valve body to seal between the second valve-position adjuster and the second valve body, one end of the second communication groove being formed to extend to such an extent that the one end of the second communication groove is opposed to the second valve-body through hole under a state where the second valve body is positioned substantially at its outermost position relatively to the second valve-position adjuster in the longitudinal direction of the second valve body, and the other end of the second communication groove being formed to extend to such an extent that the other end of the second communication groove is opposed to the second valve-body through hole under a state where the second valve body is positioned substantially at its innermost position relatively to the second valve-position adjuster in the longitudinal direction of the second valve body.

3. An integral power steering apparatus comprising:
a housing;
an input shaft adapted to be connected to a steering wheel;
a piston slidably accommodated in the housing and configured to partition an internal space of the housing into a first pressure chamber and a second pressure chamber;
a first motion converter interposed between the input shaft and the piston for converting rotary motion of the input shaft into linear motion of the piston;
a second motion converter including a rack integrally formed on an outer periphery of the piston and a sector gear kept in meshed-engagement with the rack for converting linear motion of the rack into rotary motion and arranged in the second pressure chamber;
a control valve configured to selectively supply working fluid, fed from an external working-fluid pressure source, into either one of the first and second pressure chambers;
a motion transmitter adapted to transmit a movement of the sector gear about a rotation axis to a steered road wheel;
a first valve configured to direct working-fluid pressure in the second pressure chamber to the first pressure chamber, when the piston reaches a first predetermined position in a direction for decreasing a volumetric capacity of the first pressure chamber; and
a second valve configured to direct working-fluid pressure in the first pressure chamber to the second pressure chamber, when the piston reaches a second predetermined position in a direction for decreasing a volumetric capacity of the second pressure chamber;
the first valve installed on the housing in such a manner as to face the first pressure chamber, the first valve comprising:
 a first valve body having a first plunger-accommodation bore formed therein;
 a first plunger housed in the first plunger-accommodation bore in such a manner as to retract or extend in a longitudinal direction of the first valve body;
 a first seat installed on the first valve body in such a manner as to construct a part of a first communication passage through which the first and second pressure chambers can be communicated with each other, and configured to prevent working-fluid flow through the first communication passage with the first plunger abutted on the first seat, and further configured to permit working-fluid flow through the first communication passage with the first plunger moved apart from the first seat;
 a first biasing member provided for permanently biasing the first plunger toward the first seat;
 a first abutted-engagement portion attached to the first plunger in such a manner as to protrude from the first seat toward the first pressure chamber, and configured to be brought into abutted-engagement with a first abutment portion corresponding to one end face of the piston when the first predetermined position of the piston is reached, and further configured to move together with the first plunger by a push of the first abutment portion, thereby causing the first plunger to be spaced apart from the first seat to permit the first pressure chamber to be communicated with the second pressure chamber through the first communication passage; and
 a first valve-position adjuster comprising a first intermediate sleeve formed separately from the housing, and interposed between the housing and the first valve body, and having a first valve-body accommodation bore formed therein for accommodating the first valve body;
the second valve installed on the housing in such a manner as to face the second pressure chamber, the second valve comprising:
 a second valve body having a second plunger-accommodation bore formed therein;
 a second plunger housed in the second plunger-accommodation bore in such a manner as to retract or extend in a longitudinal direction of the second valve body;
 a second seat installed on the second valve body in such a manner as to construct a part of a second communication passage through which the first and second pressure chambers can be communicated with each other, and configured to prevent working-fluid flow through the second communication passage with the second plunger abutted on the second seat, and further configured to permit working-fluid flow through the second communication passage with the second plunger moved apart from the second seat;
 a second biasing member provided for permanently biasing the second plunger toward the second seat;
 a second abutted-engagement portion attached to the second plunger in such a manner as to protrude from the second seat toward the second pressure chamber, and configured to be brought into abutted-engagement with a second abutment portion corresponding to either one of the other end face of the piston and the sector gear when the second predetermined position of the piston is reached, and further configured to move together with the second plunger by a push of the second abutment portion, thereby causing the second plunger to be spaced apart from the second seat to permit the second pressure chamber to be communicated with the first pressure chamber through the second communication passage; and
 a second valve-position adjuster comprising a second intermediate sleeve formed separately from the housing, and interposed between the housing and the second valve body, and having a second valve-body accommodation bore formed therein for accommodating the second valve body;
wherein the first valve body of the first valve is configured to enable a position of the first valve body relative to the housing to be adjusted in the longitudinal direction of the first valve body via the first intermediate sleeve, and the second valve body of the second valve is configured to enable a position of the second valve body relative to the housing to be adjusted in the longitudinal direction of the second valve body via the second intermediate sleeve, wherein the first valve-position adjuster has a first internal screw-threaded portion formed on the inner peripheral side of the first valve-position adjuster, the first valve body has a first external screw-threaded portion formed on an outer peripheral side of the first valve body and configured to permit conversion of rotary motion of the first valve body into linear motion of the first valve body by screw-threaded connection of the first external screw-threaded portion with the first internal screw-threaded portion, the second valve-position adjuster has a second internal screw-threaded portion formed on the inner peripheral side of the second valve-position adjuster, and the second valve body has a second external screw-threaded portion formed on the outer peripheral side of the second valve body and configured to permit conversion of rotary motion of the second valve body into linear motion of the second valve body by screw-threaded connection of the second external screw-threaded portion with the second internal screw-threaded portion.

4. The integral power steering apparatus as claimed in claim 3, wherein:
the first valve-position adjuster further comprises a first lock nut for holding the position of the first valve body in the longitudinal direction of the first valve body; and
the second valve-position adjuster further comprises a second lock nut for holding the position of the second valve body in the longitudinal direction of the second valve body.

5. The integral power steering apparatus as claimed in claim 3, wherein:
the housing has a first limiter-valve-mounting tapped hole;
the first valve-position adjuster has a first external screw-threaded portion formed on the outer peripheral side of the first valve-position adjuster and configured to permit conversion of rotary motion of the first valve-position adjuster into linear motion of the first valve-position adjuster by screw-threaded connection of the first external screw-threaded portion with the first limiter-valve-mounting tapped hole;
the housing has a second limiter-valve-mounting tapped hole; and
the second valve-position adjuster has a second external screw-threaded portion formed on the outer peripheral side of the second valve-position adjuster and configured to permit conversion of rotary motion of the second valve-position adjuster into linear motion of the second valve-position adjuster by screw-threaded connection of the second external screw-threaded portion with the second limiter-valve-mounting tapped hole.

* * * * *